(12) United States Patent
Nasvik

(10) Patent No.: US 8,256,179 B2
(45) Date of Patent: *Sep. 4, 2012

(54) CONCRETE VENEER PANEL WITH AIR ENTRAINED CONCRETE CORE

(76) Inventor: Paul C. Nasvik, Hudson, WI (US)

( * ) Notice: Subject to any disclaimer, the term of this patent is extended or adjusted under 35 U.S.C. 154(b) by 323 days.

This patent is subject to a terminal disclaimer.

(21) Appl. No.: 12/653,098

(22) Filed: Dec. 7, 2009

(65) Prior Publication Data

US 2010/0088989 A1 Apr. 15, 2010

Related U.S. Application Data

(63) Continuation-in-part of application No. 11/020,546, filed on Dec. 22, 2004, now Pat. No. 7,647,738.

(51) Int. Cl.
*B27K 1/00* (2006.01)
(52) U.S. Cl. ...................... 52/516; 52/506.01
(58) Field of Classification Search .................. 52/516, 52/745.19, 384, 391, 506.01
See application file for complete search history.

(56) References Cited

U.S. PATENT DOCUMENTS

| | | | | |
|---|---|---|---|---|
| 3,775,916 A | * | 12/1973 | Bair | 52/125.4 |
| 5,072,562 A | | 12/1991 | Crick et al. | |
| 5,076,037 A | | 12/1991 | Crick et al. | |
| 5,305,570 A | | 4/1994 | Rodriguez et al. | |
| 5,347,784 A | | 9/1994 | Crick et al. | |
| 5,526,630 A | * | 6/1996 | Francis et al. | 52/745.19 |
| 5,537,792 A | | 7/1996 | Moliere | |
| 6,684,587 B2 | | 2/2004 | Shaw et al. | |
| 6,737,008 B2 | | 5/2004 | Gilbert et al. | |

OTHER PUBLICATIONS

Stucco Stone Products, Inc., Cultured Stone, 1991, pp. 1-2,4-5,10-14,30-33,38-39,41-43.

* cited by examiner

*Primary Examiner* — Basil Katcheves
(74) *Attorney, Agent, or Firm* — Kinney & Lange, P.A.

(57) ABSTRACT

A multi-layered veneer panel that includes a foamed core, a concrete surface layer, and a mounting device. The concrete surface layer forms a front surface and an edge perimeter region of the veneer panel. The front surface approximates a desired topography of a simulated wall. The foamed core forms a back surface of the veneer panel and is disposed adjacent the concrete surface layer. The mounting device is cast into at least one of the concrete surface layer and the foamed core and extends from the edge perimeter region. A method of making a multi-layered veneer panel is also disclosed.

13 Claims, 24 Drawing Sheets

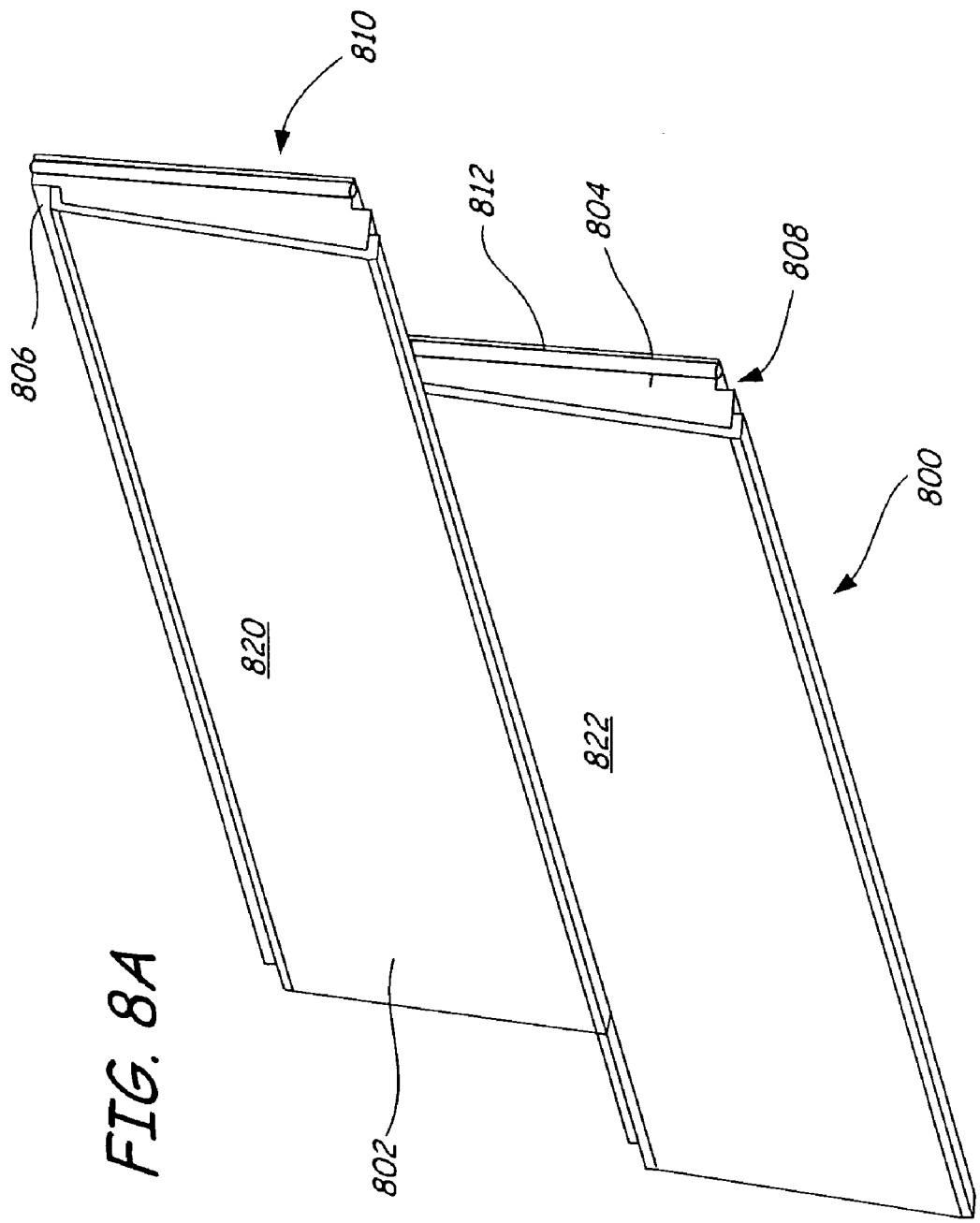

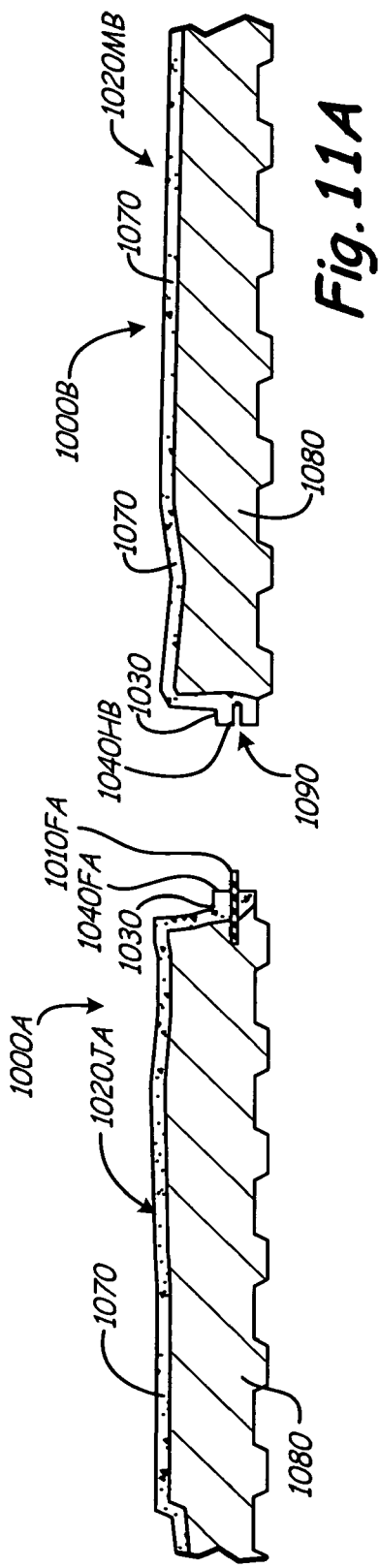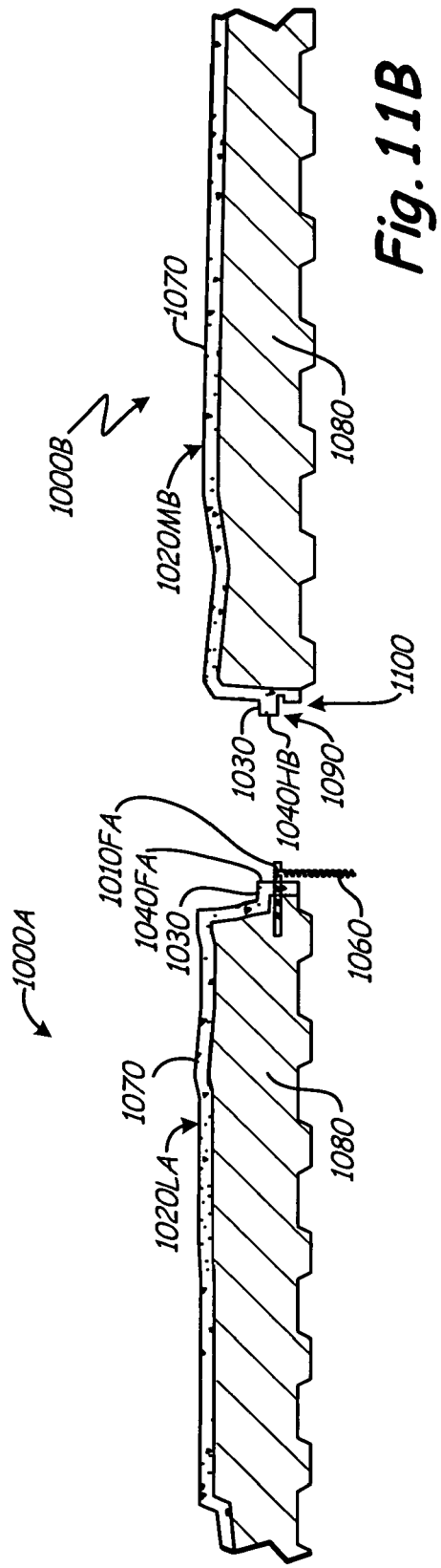

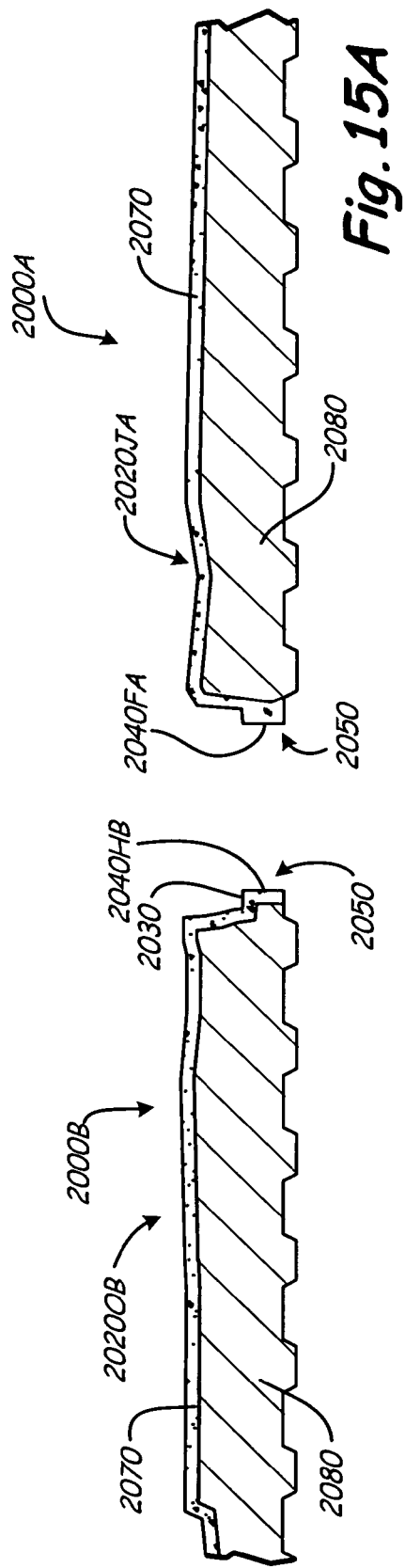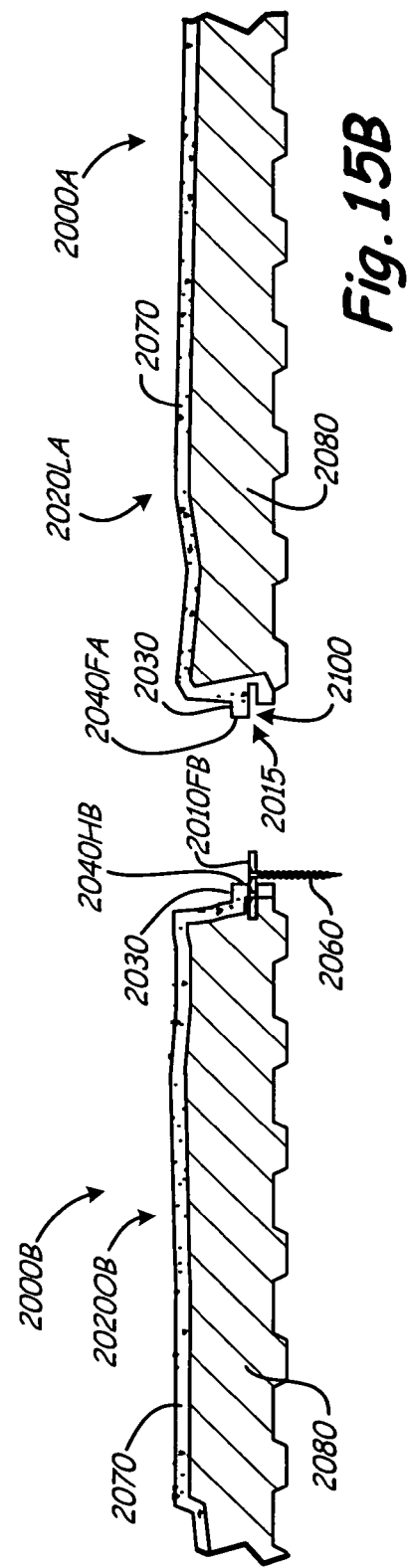

CONCRETE VENEER PANEL WITH AIR ENTRAINED CONCRETE CORE

CROSS-REFERENCE TO RELATED APPLICATION(S)

This application is a continuation-in-part of U.S. patent application Ser. No. 11/020,546, entitled PRE-CAST CONCRETE VENEER SYSTEM WITH INSULATION, and filed on Dec. 22, 2004, the disclosure of which is incorporated by reference in its entirety.

BACKGROUND

The present invention relates to veneer systems for finishing the exterior appearance of walls. In particular, the present invention relates to lightweight concrete panels that can be inexpensively manufactured and easily installed using the methods and devices disclosed.

Many types of materials are used to form the exterior finish of buildings. Many factors go into choosing the exterior finish for each building, including appearance, cost, ease of installation, durability and insulating capacity. Stone, brick and wood finishes are popular due to their aesthetic appearance and durability. In particular, cut stone, natural stone, brick, log siding, shingle siding, and lap siding are examples of systems used as exterior finishes for building walls.

A variety of simulated texture wall products have been developed in an attempt to make walls resemble ones made of a more desirable finish, but are less expensive and more easily installed than stone, brick or wood.

Veneer systems are used to simulate exterior surfaces. Veneer systems consist of paneling which can be attached to a wall surface, similar to exterior siding or interior paneling. The veneer panels may be formed to have a simulated surface of stone or other such pattern. However, many of these veneer systems, particularly those made of vinyl products, are not realistic in texture or appearance and are flammable. Problems arise from the inability to create a random pattern of unique stones using a minimum number of veneer panels. Veneer systems are particularly susceptible to "paneling out", wherein it becomes obvious that the pattern is repeating and non-random.

Concrete has a realistic texture and feel, and resembles stone and wood more than other types of building materials. Thus, concrete is a particularly suitable, and the preferred material for constructing veneer panels for simulating stone, wood or other natural surfaces. Concrete also has many of the ideal characteristics for finishing a building exterior, such as durability and weather resistance. However, forming a veneer system using concrete has been difficult to date. In particular, a pre-cast foam insert layer commonly utilized by concrete veneers to reduce panel weight requires expensive molding and machining techniques. Additionally, structural requirements limit the size of the foam insert. This greatly reduces the kinds of patterns and sizes of the veneer panel that can be produced. The foam insert layer is also flammable, and thus, is not ideal for use in many building applications.

Thus, there is a need in the industry for a light-weight panel system that accurately reproduces the look and feel of stone, wood or other natural finishes. In particular, there is a need for fabricating inexpensive, light-weight, and durable panels made of concrete that can be effectively installed to realistically reproduce natural finishes.

SUMMARY

The present invention comprises a multi-layered veneer panel that includes a foamed layer, a concrete surface layer, and a mounting device. The mounting device is cast into the multi-layered panel and extends therefrom.

In another aspect, a multi-layered veneer panel that includes a foamed core, a concrete surface layer, and a mounting device. The concrete surface layer forms a front surface and an edge perimeter region of the veneer panel. The front surface approximates a desired topography of a simulated wall. The foamed core forms a back surface of the veneer panel and is disposed adjacent the concrete surface layer. The mounting device is cast into at least one of the concrete surface layer and the foamed core and extends from the edge perimeter region.

The invention includes a method of making a multi-layered panel by providing a mold that has a negative pattern. An amount of a first concrete is placed into the mold and a second concrete, comprising a super air entrained concrete, is placed over the first concrete. One or more mounting devices are disposed in at least one of the first concrete and the second concrete before the first concrete or second concrete has set.

BRIEF DESCRIPTION OF THE DRAWINGS

FIG. 8A shows a third embodiment of the present invention with a simulated lap siding finish.
FIG. 11A shows a cross-section view of the two multi-layered panels taken along a plane normal to the front surface and extending through one of the mounting devices adjacent a fastener which is not shown.
FIG. 11B shows a cross-section view of the two multi-layered panels taken along a plane normal to the front surface and extending through the fastener disposed in the mounting device.

FIG. 15A shows a cross-section view of the two multi-layered panels taken along a plane normal to the front surface and extending adjacent one of the mounting devices.

FIG. 15B shows a cross-section view of the two multi-layered panels taken along a plane normal to the front surface and extending through the fastener disposed in the mounting device.

DETAILED DESCRIPTION

Figure 1A:
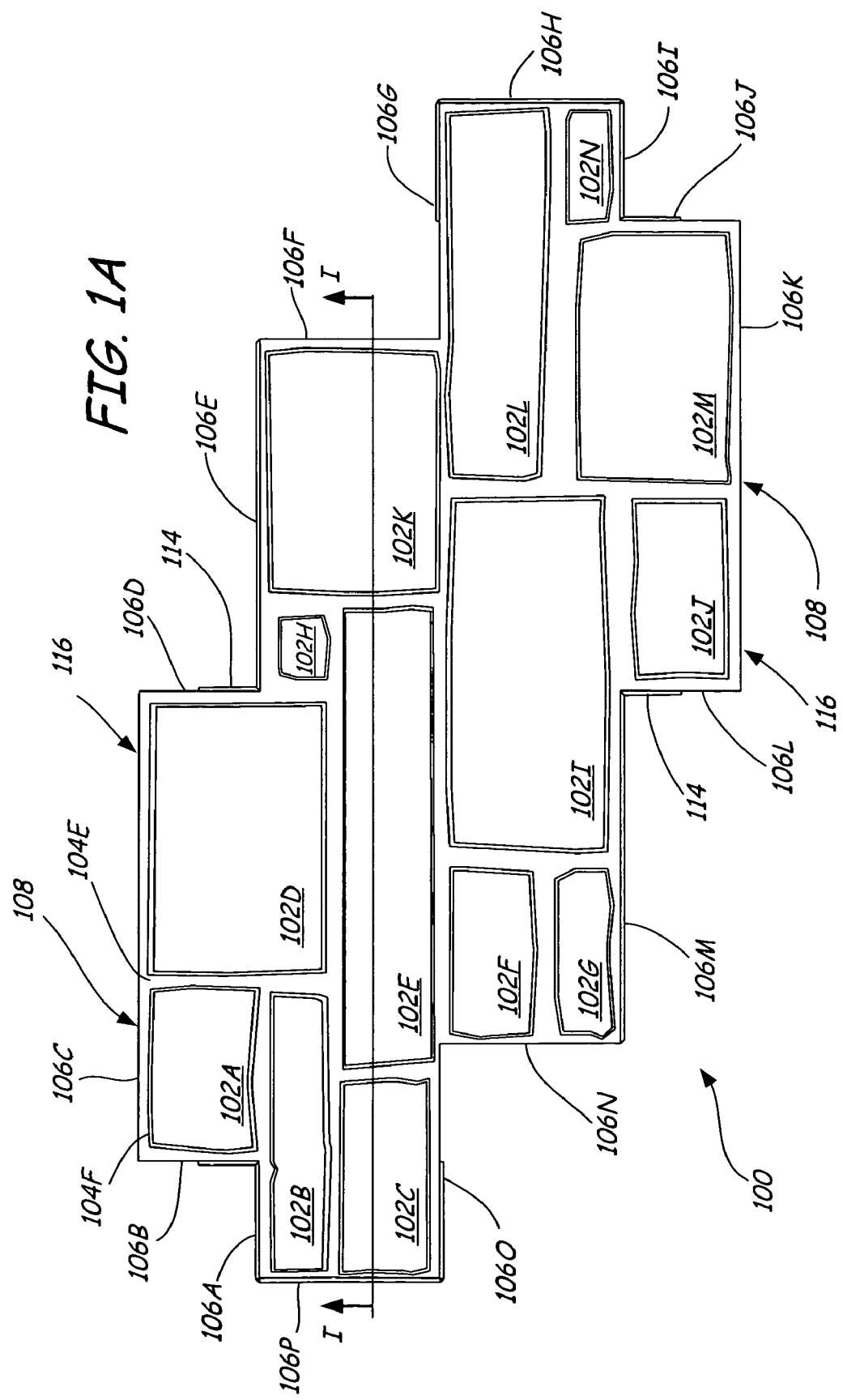
FIG. 1A shows a front view of a multi-layered panel.

FIG. 1A shows a front view of multi-layered panel 100, which is part of a veneer system for finishing an exterior wall. In this embodiment, the front of multi-layered panel 100 shows a simulated cut stone pattern with simulated regions of mortar filling the space between the stones. In this embodiment, there are fourteen individual stones 102A-102N. Individual stones 102A-102N each have a unique look and are arranged to appear carefully stacked thus creating regions of mortar 104 with even spacing between the stones. Individual stones 102A-102N are represented by raised regions protruding beyond the surface of multi-layered panel 100 and mortar 104 is represented by lowered regions.

Multi-layered panel 100, in this embodiment, utilizes a multi-edged shape to facilitate the appearance of natural cut and stacked stones. In this embodiment the multi-layered panel 100 has sixteen sides 106A-106P. Side 106A is the same length as side 106I. Side 106B is the same length as side 106L. Side 106C is the same length as side 106K. Side 106D is the same length as side 106J. Side 106E is the same length as side 106M. Side 106F is the same length as side 106N. Side 106G is the same length as side 106O. Side 106H is the same length as side 106P. Thus, multi-shaped panel 100 has edge symmetry when rotated one hundred eighty degrees.

The multi-edged shape allows individual stones 102A-102N to have various shapes and to be neatly stacked within the perimeter of multi-layered panel 100. The placement of variously shaped stones and the multi-edged shape help to conceal the repetitive nature of using multiple multi-layered panels 100.

Multi-layered panel 100 also comprises edge perimeter region 108. Edge perimeter region 108 encircles the entire multi-layered panel 100. Edge perimeter region 108 includes tongues 114 and grooves 116 of a tongue and groove system for interlocking multiple, adjacent multi-layered panels 100. Edge perimeter region 108 always begins in a lowered region of mortar 104 such that the width of the mortar 104 at the edge is less than what it normally would be as between two individual stones 102A-102N. For example, the region of mortar 104E between stones 102A and 102D is generally greater in width than the region of mortar 104F between stone 102A and the edge perimeter region 108. Thus, when coupled with an adjacent multi-layered panel 100, two partial regions of mortar 104E at the edge of each multi-layered panel 100 will create one whole region of mortar 104. This feature also helps to conceal the use of multiple multi-layered panel 100.

Figure 1B:
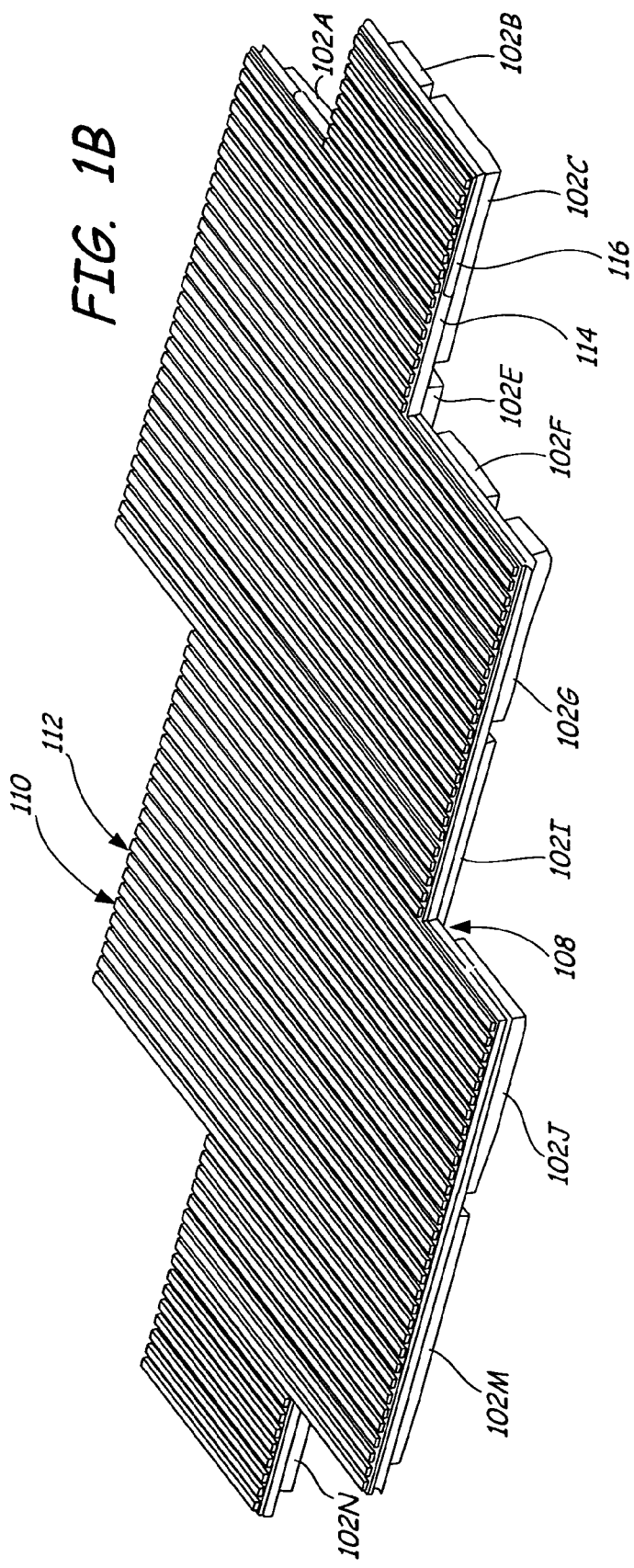
FIG. 1B shows the back side of the multi-layered panel.

FIG. 1B shows the back side of multi-layered panel 100, which comprises a series of standoffs or ribs 110 and grooves 112. The channels 112 run vertically along multi-layered panel 100. The ribs 110 and grooves 112 form a channel that facilitates air flow between multi-layered panel 100 and the surface to which it will be attached. Air flow between multi-layered panel 100 and the surface to which it will be attached is important to prevent problems associated with mold and moisture. Other types of channels or grooves can also be featured on the back side of multi-layered panel 100 to facilitate air flow.

Edge perimeter region 108 can also be seen. Edge perimeter region 108 comprises an interlocking means for connecting multiple, adjoining multi-layered panels 100 in an installed veneer system. In this embodiment, the interlocking means is a tongue and groove system. Tongue 114 extends beyond the outside perimeter of multi-layered panel 100, while groove 116 is recessed within the edge perimeter region 108. When adjoining multi-layered panels 100 are installed as part of a veneer system, tongue 114 of one multi-layered panel 100 fits into groove 116 of an adjoining multi-layered panel 100. Tongue 114 and groove 116 are distributed around the edge perimeter region 108 such that adjacent multi-layered panels 100 will always be properly interlocked together in each of the one hundred eighty degree rotated configurations.

Figure 1C:
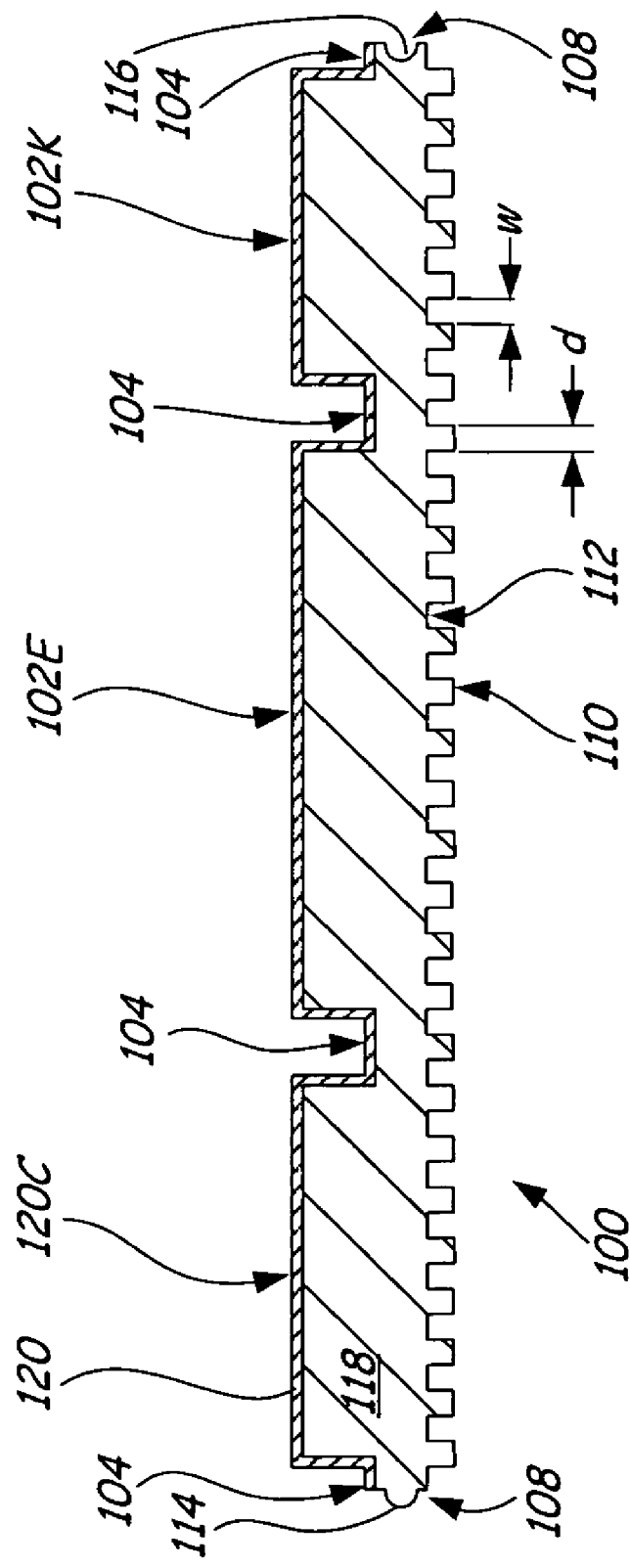
FIG. 1C shows a cross-section view of a multi-layered panel taken along a plane normal to the front surface of the multi-layered panel.

FIG. 1C is cross-section I-I of multi-layered panel 100 from FIG. 1A. Multi-layered panel 100 is comprised of foam layer 118 and concrete layer 120.

Concrete layer 120 simulates the look of a stone wall. The use of concrete in multi-layered panel 100 realistically simulates the texture and likeness of a stone wall or other building finishes. Individual stones 102C, 102E and 102K are shown as raised regions. Simulated mortar 104 fills in the space between individual stones 102C, 102E, 102K and at the edges of the individual stones 102C and 102K. Concrete layer 120 is cast with a uniform thickness onto the surface of foam layer 118. In preferred embodiments it is 0.25 to 0.375 inches thick.

Foam layer 118 completely fills in the back of concrete layer 120, providing a solid backing that supports concrete layer 120. Foam layer 118 also provides an easily shapable, lightweight material for forming other features that enhance multi-layered panel 100.

Foam layer 118 of multi-layered panel 100 comprises ribs 110 and grooves 112 that form a channel having a width w on its back surface. The ribs 110 are designed to allow airflow between multi-layered panel 100 and the surface to which it will be mounted. The ribs 110 have a width d that is smaller than the channel width w. In one embodiment, d is 0.75 inches and w is 1.25 inches. Ribs 110 also serve as a surface for application of double sided adhesive tape to allow easy installation of multi-layered panel 100 onto a flat surface. Other fastening methods can also be used to install multi-layered panel 100.

Foam layer 118 also forms part of edge perimeter region 108. Tongue 114 and groove 116 of the interlocking system are shown. Tongue 114 extends beyond the cement layer 120 while groove 116 is recessed within foam layer 118. Edge perimeter region 108 can also have no interlocking system features or other types of interlocking systems.

Figure 2:
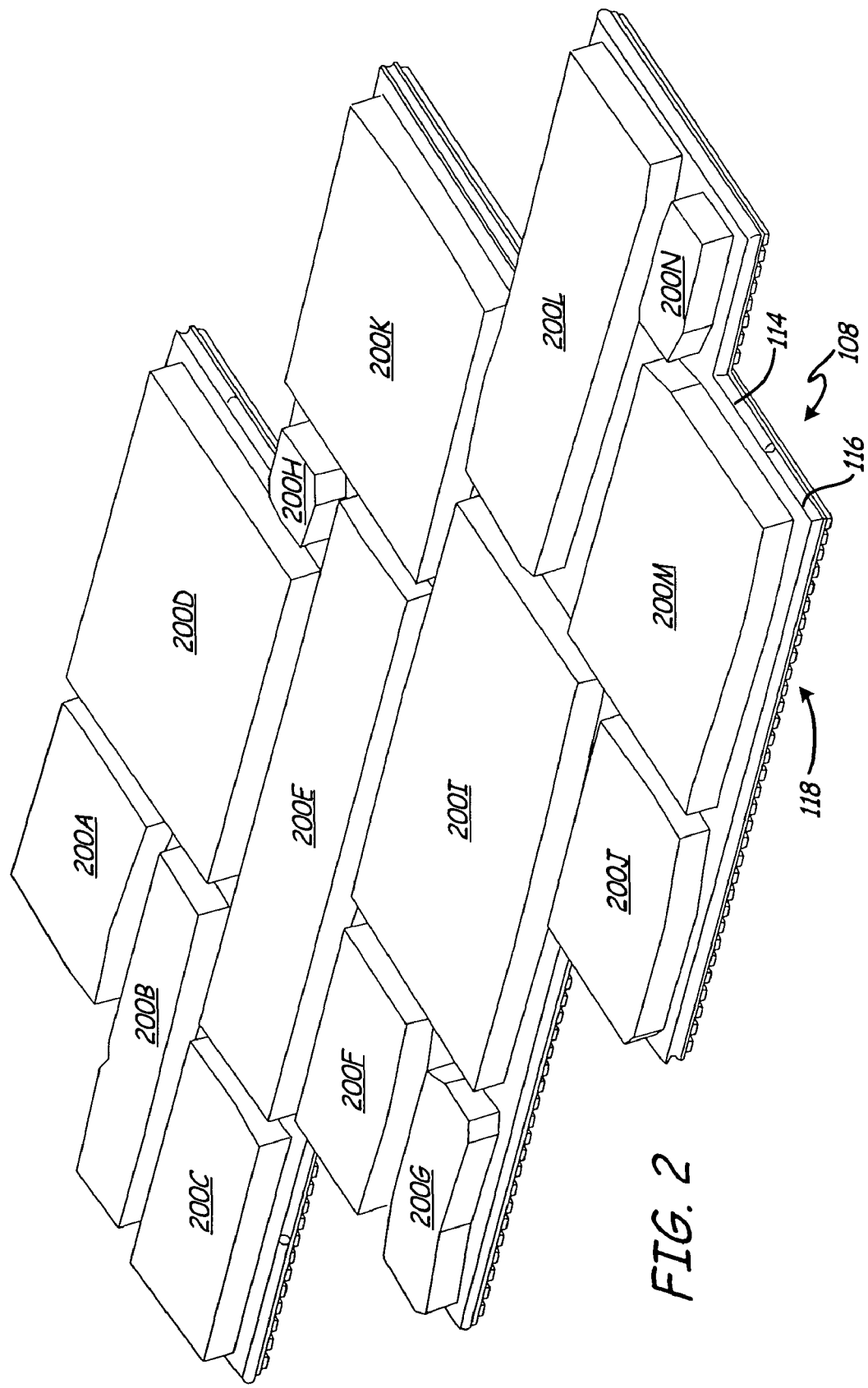
FIG. 2 shows the front side of the foam layer of a multi-layered panel.

FIG. 2 shows the front side of foam layer 118. Concrete layer 120 is cast onto foam layer 118. The front side of foam layer 118 has the topology of a desired surface finish for a wall. The topology features of foam layer 118 provide a foundation for concrete layer 120.

The dimensions of the topology features on the front side of foam layer 118 are designed such that when the front side of foam layer 118 is built up with concrete layer 120, the finished multi-layered panel 100 will have the dimensions of the desired simulated exterior finish. Accordingly, the gaps between the foam that comprise each stone base 200A-200N of the finished multi-layered panel 100 is larger than the gaps between each stone 102A-102N of multi-layered panel 100.

Multi-layered panel 100 is constructed using a casting technique. Multi-layered panel 100 is made by casting concrete layer 120 onto a preformed foam layer 118. It is desirable to have concrete as the exterior finish of multi-layered panel 100 because it accurately replicates the look and texture of stone and other natural finishes and also has superior durability. Concrete layer 120 is preferably 0.25-0.375 inches thick. This creates a panel with decreased weight and good weight distribution. This also reduces the amount of concrete needed to create each panel, which helps keep manufacturing costs down. Foam is the preferred backing layer for concrete layer 120 because it is lightweight, it has good insulating characteristics and it is easily shaped in manufacturing. Preformed foam layer 118 can be made with a casting technique or any other suitable method. The foam can easily be shaped to include ribs 110 and grooves 112 for providing ventilation between multi-layered panel 100 and the surface to which it will be mounted. Systems for interconnecting adjacent multi-layered panels 100 can be easily incorporated into edge perimeter region 108 of foam layer 118. For example, tongues 114 and groove 116 can easily be formed on edge perimeter region 108. The interconnecting systems can be formed integrally as part of the preformed foam layer 118 or can be added to the foam layer 118 with additional finishing steps. Other materials can also be used as the backing layer for concrete layer 120. The combination of a thin concrete layer and a foam backing layer creates a panel that is extremely lightweight. Lightweight panels are easier to handle, transport and install. Having a light-weight panel also makes it possible to create larger panels. Larger panels reduce the number of seam lines on finished walls and reduces the noticeability of repeated panels.

The major components involved in making multi-layered panel 100 include a mold, a preformed foam layer 118, a temporary backing and a concrete mixture. The mold has a cavity with the reverse impression of the pattern that is to present the outside surface of multi-layered panel 100. The preformed foam layer 118 is inserted into the mold cavity in order to seal the mold. The preformed foam layer 118 is created so that when the thin concrete layer 120 is cast onto it, the final dimensions of multi-layered panel 100 will be that of the desired exterior finish. The temporary backing is used to limit the amount the preformed foam layer 118 can be inserted into the mold. The temporary backing is temporarily affixed to the back of the preformed foam layer 118. The concrete mixture is distributed within the mold cavity for creating concrete layer 102. The concrete mixture is preferably a fiber reinforced composite that is lightweight, durable and will adhere to foam layer 118.

The method of casting multi-layered panel 100 involves several steps. First, the temporary backing is placed on foam layer 118 to limit the amount foam layer 118 can be inserted into the mold. This is set, in one embodiment, to 0.25 inches. Thus, when preformed foam layer 118 is placed into the mold, there is a 0.25 inch space between the surface of the mold and the surface of preformed foam layer 118. Next, any dyes or additives are added to the mold cavity. Liquid or powder dyes can be applied in various patterns and quantities to enhance the final appearance of multi-layered panel 100. Dyes can be used to change the color of the concrete mixture and to give the concrete the appearance of a desired texture. Next, a predetermined amount of concrete mixture is placed into the mold cavity. In one embodiment, the concrete mixture is sprayed onto the surface of the mold cavity. An amount of concrete mixture can be used that equals the volume of the closed mold chamber. Next, preformed foam layer 118 is inserted into the mold cavity. The temporary backing ensures preformed foam layer 118 is inserted to the proper depth. Preformed foam layer 118 is secured to the mold to prevent movement. The concrete mixture will bond to preformed foam layer 118 as it hardens. The dyes or additives will color the concrete mixture at the surface of the mold. After the concrete mixture hardens, preformed foam layer 118 can be removed from the mold. The concrete mixture will have formed a thin, uniformly-thick concrete layer 120 on the surface of preformed foam layer 118. Finally, the temporary backing can be removed from preformed foam layer 118. Finished multi-layered panel 100 will have a concrete finish that realistically resembles a stone, wood, or brick finish.

Although the method describes the preformed foam layer being inserted into a mold in order to form the concrete layer, other suitable methods can also be used including casting the concrete mixture directly onto the preformed foam layer.

Figure 3:
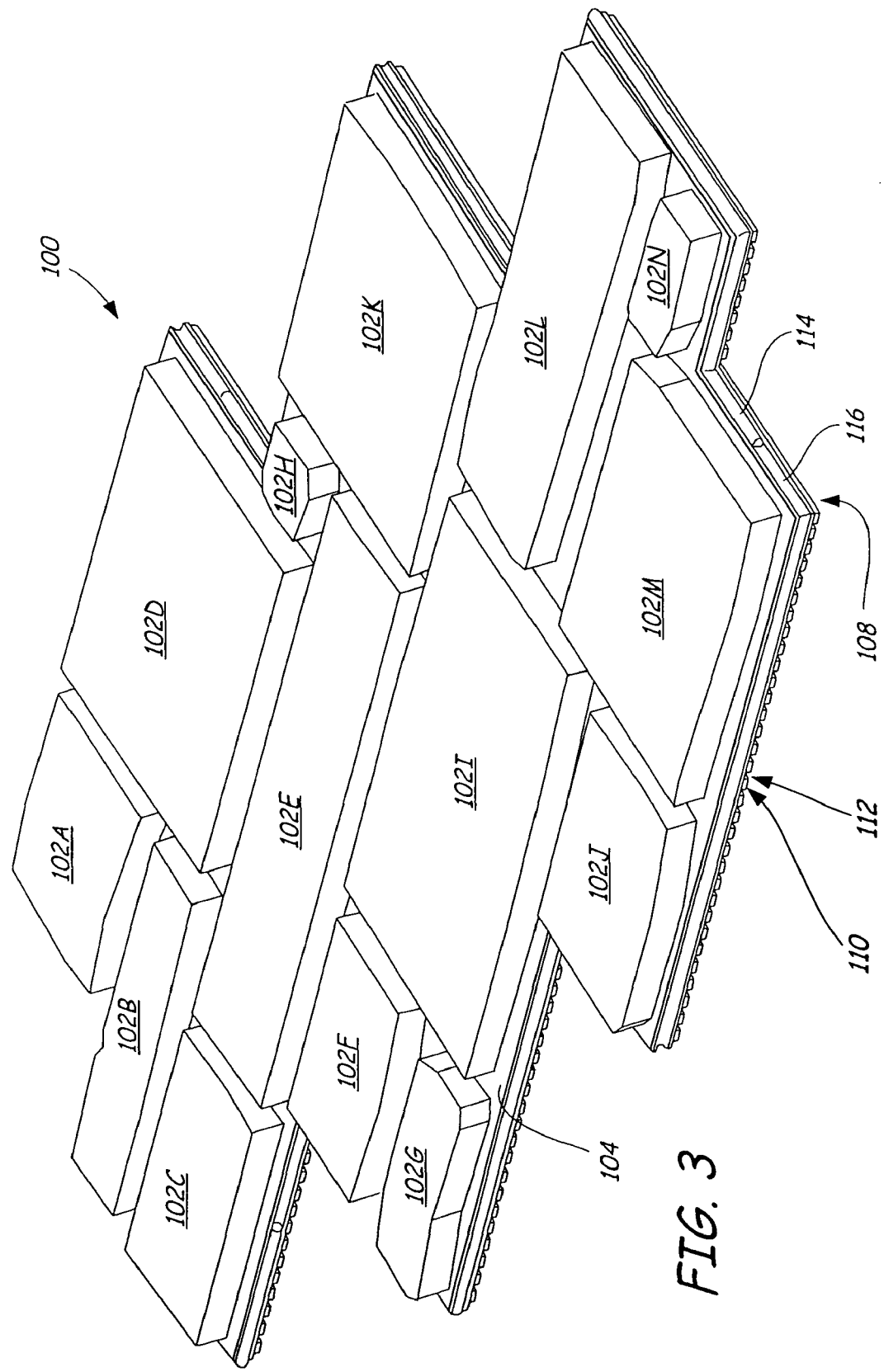
FIG. 3 shows a perspective view of a multi-layered panel.

FIG. 3 shows a perspective view of multi-layered panel 100 having concrete layer 120 cast onto foam layer 118. This view shows the depth of the elevated regions comprising the stones 102A-102N as compared to the mortar 104 regions. Edge perimeter region 108 and tongues 114 and grooves 116 of the interlocking system are still visible after concrete layer 120 has been cast onto foam layer 118. Ribs 110 and grooves 112 are also still visible.

Figure 4A:
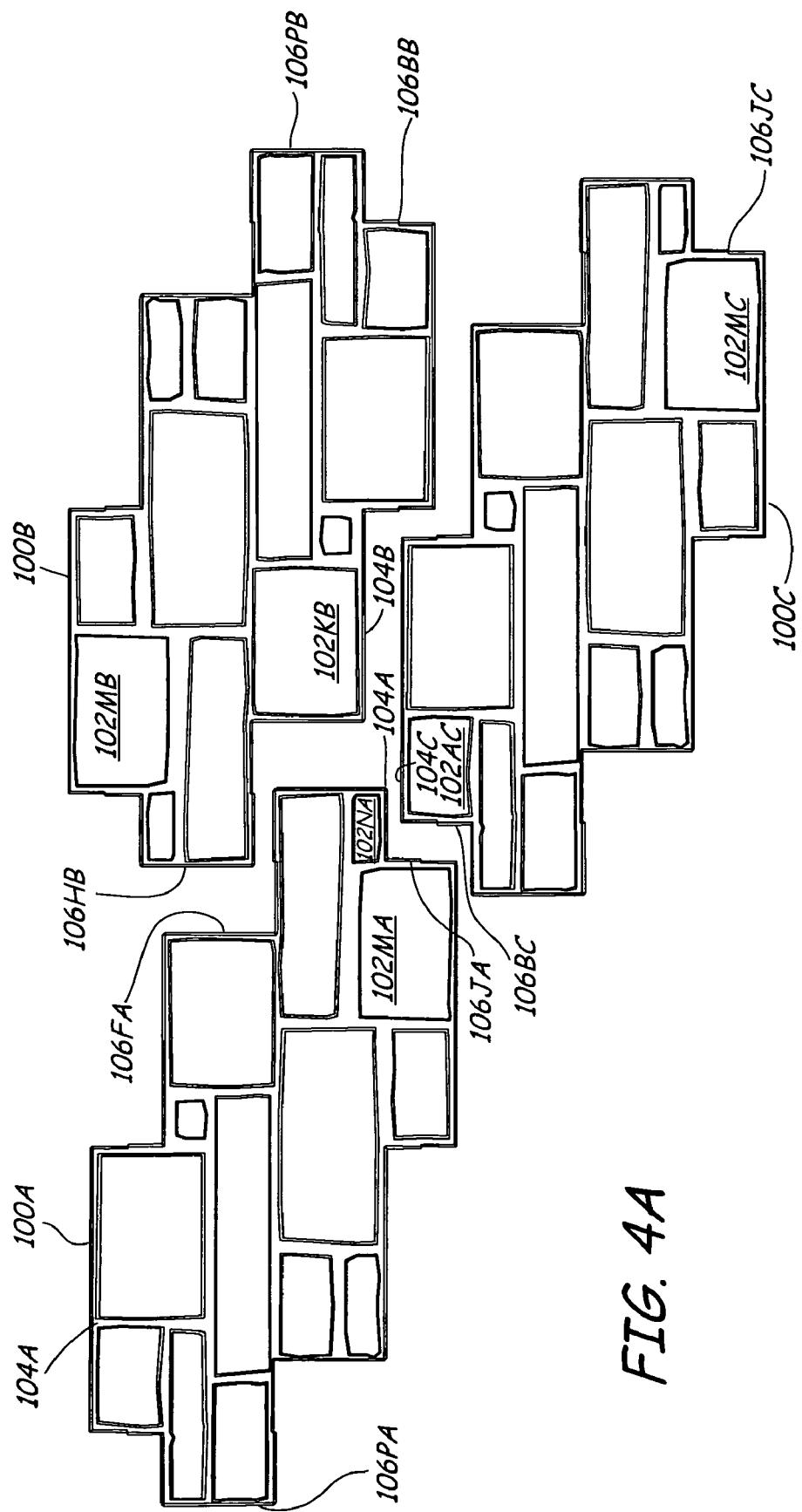
FIG. 4A shows three multi-layered panels coming together.

FIG. 4A shows three multi-layered panels 100A, 100B, 100C coming together. At the edge of each multi-layered panel 100A, 100B, 100C, the regions of mortar 104A, 104B, 104C are of a reduced width. When adjoining multi-layered panels 100A, 100B, 100C are placed together the regions of mortar 104A, 104B, 104C that are reduced in width form one region of mortar of uniform width. This aids in concealing the artificial and repetitive nature of multi-layered panels 100A, 100B, 100C.

Multi-layered panels 100A, 100B, 100C are designed to be placed directly next to each other and directly above and below each other. The many sided shape of multi-layered panels 100A, 100B, 100C allows each multi-layered panel 100A, 100B, 100C to be installed in two orientations for every situation. Multi-layered panels 100A, 100B, 100C can be installed in a first configuration or in a one hundred eighty degree rotation of the first configuration.

First panel 100A sits in the upper left side of FIG. 4A. Second panel 100B is located directly to the right of first panel 100A. Side 106HB is designed to fit against side 106FA of multi-layered panel 100A. Second panel 100B is rotated one hundred and eighty degrees as compared to first panel 100A. Side 106PA of multi-layered panel 100A is on the left side of multi-layered panel 100A. The equivalent side, side 106PB, of multi-layered panel 100B is on the right side of multi-layered panel 100B. Second panel 100B could also be placed where it is, but rotated one hundred eighty degrees. Thus, side 106PB could is also designed to fit against side 106FA of multi-layered panel 100A. Similarly, stone 102MA is in the lower right side of multi-layered panel 100A, while stone 102MB is in the upper left side of multi-layered panel 100B.

Third panel 100C is located directly below second panel 100B. Side 106BC is designed to fit against side 106JA. Third panel 100C is rotated one hundred eighty degrees as compared to second panel 100B. Side 106BB of multi-layered panel 100B is on the right side of multi-layered panel 100B. The equivalent side, side 106BC, of multi-layered panel 100C is on the left side of multi-layered panel 100C. Third panel 100C could also be placed where it is, but rotated one hundred eighty degrees. Thus, side 106JC is also designed to fit against side 106JA of multi-layered panel 100A. Similarly, stone 102MC is in the lower right side of multi-layered panel 100C, while stone 102MB is in the upper left side of multi-layered panel 100B.

Multi-layered panels 100A, 100B, 100C can thus be placed directly above, below and next to each other in random orientations to create a wall that simulates the random placement of unique stones in a real stone wall. The tongues 114 and groove 116 of the tongue and groove interconnect system are arranged to allow installation in the two orientations.

Figure 4B:
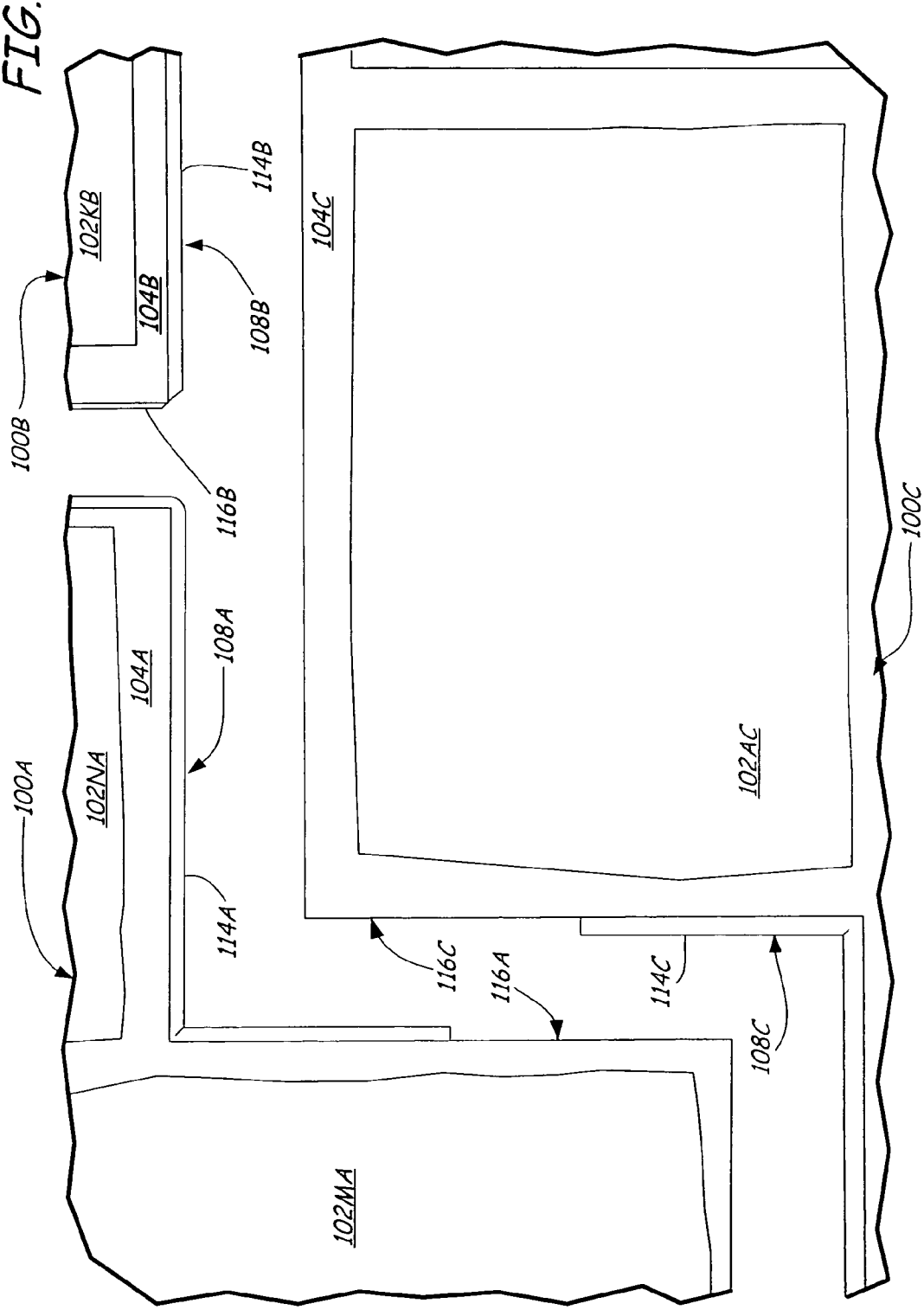
FIG. 4B shows a close up of three multi-layered panels coming together.

FIG. 4B shows a close up of edge perimeter regions 108A, 108B, 108C of three multi-layered panels 100A, 100B, 100C coming together. Stones 102MA, 102NA, 102KB, 102AC of FIG. 4A can be seen. In this view it can be seen how tongues 114A, 114B, 114C and groove 116A, 116B, 116C of adjacent multi-layered panels 100A, 100B, 100C interlock. Tongues 114A, 114B, 114C and groove. 116A, 116B, 116C are distributed around edge perimeter regions 108A, 108B, 108C such that adjacent multi-layered panels 100A, 100B, 100C will always match up. Tongue 114A of first multi-layered panel 100A fits into grooves 116B, 116C of adjacent multi-layered panels 100A, 100B. Similarly, tongue 114B of second multi-layered panel 100B fits into groove 116C of third multi-layered panel 100C. Tongue 114C of third multi-layered panel 100C fits into groove 116A of first multi-layered panel 100A. Tongues 114A, 114B, 114C and grooves 116A, 116B, 116C will line up for either one hundred eighty degree orientation of each multi-layered panel 100A, 100B, 100C. Each multi-layered panel 100A, 100B, 100C has tongues 114A, 114B, 114C and grooves 116A, 116B, 116C symmetry when rotated one hundred eighty degrees. When multi-layered panels 100A, 100B, 100C are interlocked, the exposed tongues 114A, 114B, 114C is completely enclosed in adjoining grooves 116A, 116B, 116C of adjoining multi-layered panels 100A, 100B, 100C. Thus, when installed as part of the veneer system the tongue and groove system is completely concealed.

Figure 5:
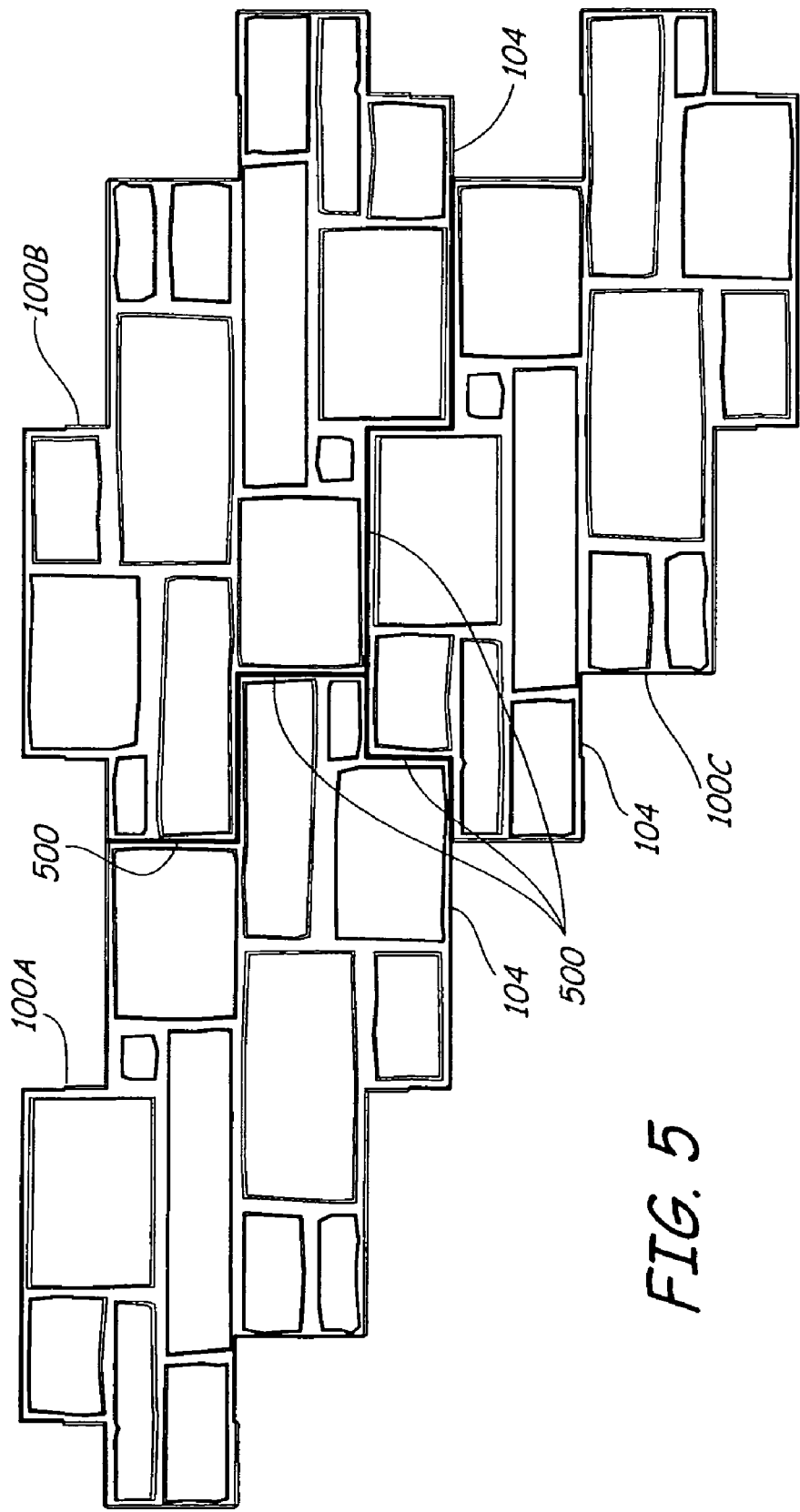
FIG. 5 shows three multi-layered panels interconnected together.

FIG. 5 shows three multi-layered panels 100A, 100B, 100C interconnected together. Arrow 500 points to the edges of adjoining multi-layered panels 100A, 100B, 100C. At the edge of each multi-layered panel 100A, 100B, 100C, the regions of mortar. 104 are of a reduced width. When adjoining multi-layered panels 100A, 100B, 100C are placed together the regions of mortar 104 that are reduced in width form one region of mortar 104 of standard width. This aids in concealing the artificial and repetitive nature of multi-layered panels 100A, 100B, 100C. It can also be seen how the foam layers of each multi-layered panel 100A, 100B, 100C are completely hidden from view in interlocked panels 100A, 100B, 100C. The interconnected multi-layered panels 100A, 100B, 100C together form an integrated wall facade with minimal seam lines and a non-repetitive look.

Figure 6:
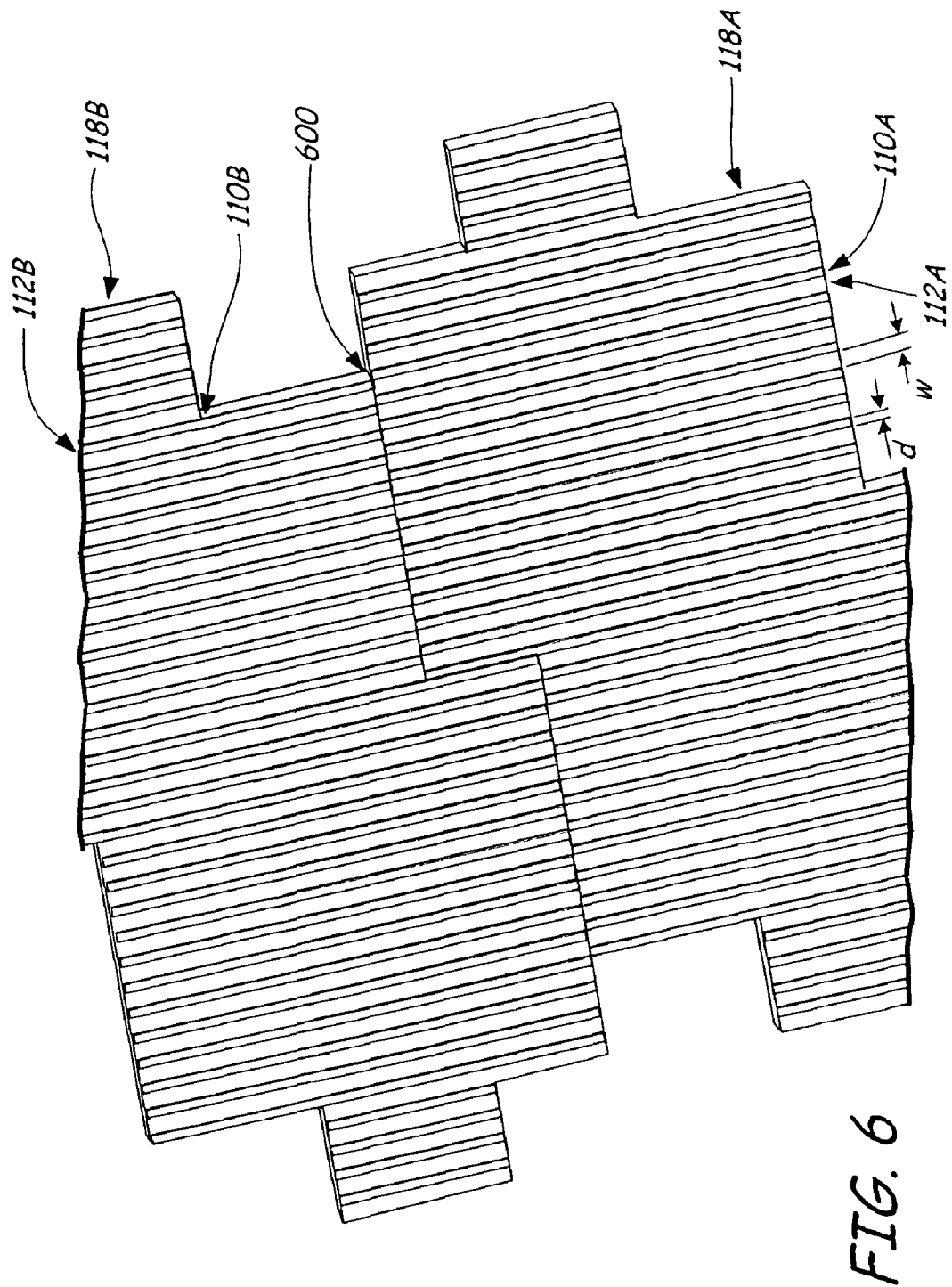
FIG. 6 shows the back sides of interconnected foam layers of two multi-layered panels.

FIG. 6 shows the back sides of two interconnected foam layers 118A, 118B. The back sides of foam layers 118A, 118B consist of a series of ribs 110A, 110B and grooves 112A, 112B. Ribs 110A, 110B have a width d that is smaller than the distance w between the edges of adjacent ribs 110A, 110B. In a preferred embodiment w equals 1.25 inch and d equals 0.75 inch. Arrow 600 shows misaligned ribs 110A, 110B and grooves 112A, 112B of adjacent foam layers 118A, 118B. It can be seen that vertical air flow is still possible despite the misaligned ribs 110A, 110B. This configuration ensures that there will always be vertical air flow no matter how interlocked multi-layered panels are connected together or if the ribs 110A, 110B and grooves 112A, 112B of adjacent multi-foam layers 118A, 118B are misaligned. Other features can be integrated onto the back of the foam layers 118A, 118B to facilitate air flow in other embodiments of the present invention.

Yet another benefit of having ribs 110A, 110B in this configuration is that it allows for easy installation of the multi-layered panels 100. Ribs 110 also serve as a continuous surface for easily applying double sided adhesive tape, or any other adhesive system, to allow easy installation of multi-layered panel 100.

Figure 7A:
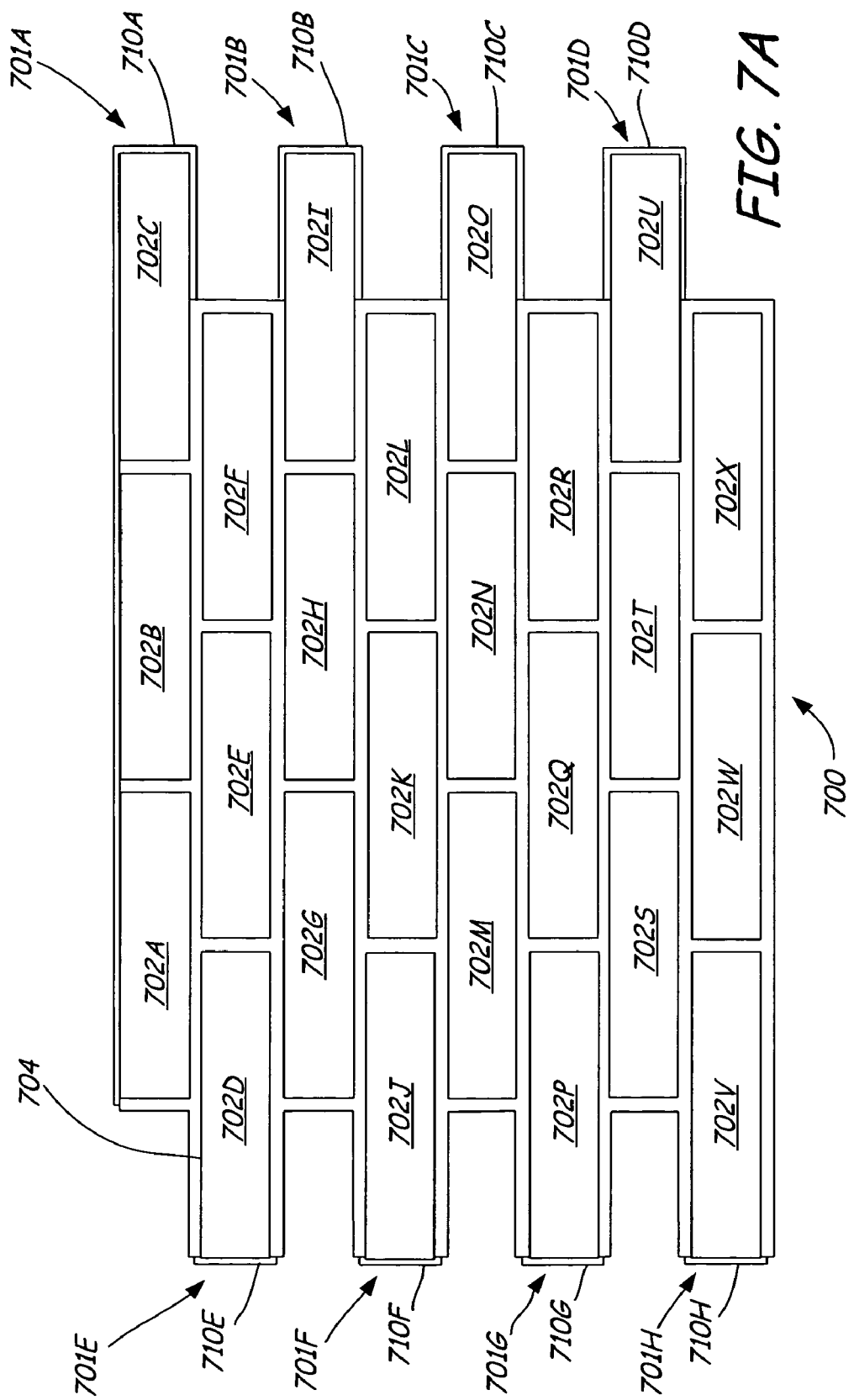
FIG. 7A shows a second embodiment of the multi-layered panel with a simulated brick finish.

FIG. 7A shows a front view of a second embodiment of the multi-layered panel 700 for use in a veneer system. In this embodiment multi-layered panel 700 has a simulated brick finish. Multi-layered panel 700 is comprised of a foam layer and a concrete layer similar to that of multi-layered panel 100 of the first embodiment. Simulated bricks 702A-702X are made up of raised regions. Simulated mortar 704 fills in the area between the bricks 702A-702X. Multi-layered panel 700 comprises eight rows of three bricks. Each row is offset by one half the length of one brick, creating a protruding row of bricks at the end of each row. A first set of rows 701A, 701B, 701C, 701D including the top row, protrude to the right. A second set of rows 701E, 701F, 701G, 701H protrude to the left. Every multi-layered panel 700 in an installed veneer system is identical. They are designed to be placed in the same orientation directly next to and on top of each other. Multi-layered panel 700 of this embodiment is constructed using a similar casting method similar to that of multi-layered panel 100 of the first embodiment.

The multi-layered panel 700 comprises an overlapping slat system for interlocking the multi-layered panels 700. The slats are part of the edge perimeter region of the foam layer. From the front view of multi-layered panel 700, the only portion of the foam layer that can be seen is the portion comprising the slats. On the right side of the first row 701A the foam layer extends beyond the concrete layer a standard width to form slat 710A. Slat 710A extends all the way around the portion of the brick 702C protruding the right side of multi-layered panel 700 and continues along the top of multi-layered panel 700. Slats 710B, 710C, 710D extend all the way around the portion of the bricks 702I, 702O, 702U protruding the right side of multi-layered panel 700. On the left side of rows 701A, 701B, 701C, 701D the concrete layer completely covers the foam layer. On the left side of the rows 701E, 701F, 701G, 701H the foam layer extends beyond the concrete layer a uniform width only on the left edge of bricks 702D, 702J, 702P, 702V protruding the left side of multi-layered panel 700 to form slats 710E, 710F, 710G, 710H. On the right side of the rows 701E, 701F, 701G the concrete layer completely covers the foam layer. On the right side of row 701H the concrete layer completely covers the foam layer and continues to do so along the bottom of multi-layered panel 700.

Figure 7B:
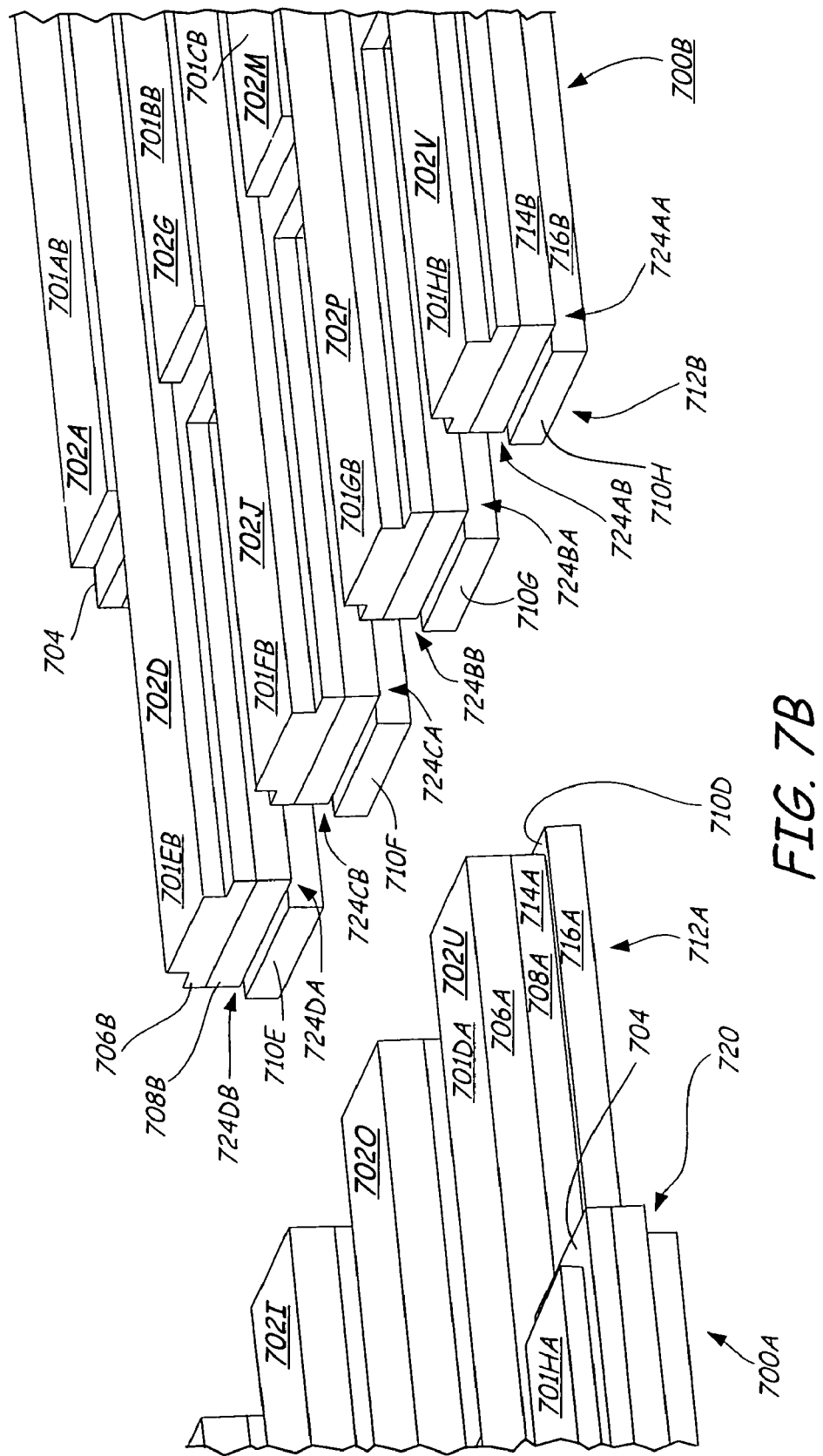
FIG. 7B shows two multi-layered panels of the second embodiment of the invention coming together.

FIG. 7B shows two multi-layered panels 700A, 700B coming together. Each multi-layered panel 700A, 700B is comprised of a concrete layer 706A, 706B and a foam layer 708A, 708B. Each concrete layer 706A, 706B is a thin layer of concrete having uniform thickness. Each brick 702A, 702G, 702M, 702D, 702J, 702P, 702V, 702I, 702O, 702U is represented by a raised region of concrete layers 706A, 706B. Mortar 704 is represented by a lowered region of concrete layers 706A, 706B. Concrete layers 706A, 706B always come to the edge of each multi-layered panel 700A, 700B at the edge of a row of bricks or at the edge of a full width of mortar 704. Concrete layers 706A, 706B are cast onto preformed foam layers 708A, 708B, respectively.

Foam layers 708A, 708B provide a solid backing that support concrete layers 706A, 706B. Foam layers 708A, 708B consist of a first portion 714A, 716B for supporting the concrete layer and a second portion 716A, 716B comprising the slats for the interlocking system. The dimensions of the front side of foam layers 708A, 708B are designed to accommodate the application of thin concrete layer 706A, 706B such that the finished multi-layered panels 700A, 700B will have the dimensions of the desired simulated brick finish.

Foam layers 708A, 708B also provide an easily shapable, lightweight material for forming other features that enhance multi-layered panels 700A, 700B. The back side of foam layers 708A, 708B can also have ribs and grooves as described in the first embodiment, shown in FIG. 6, to facilitate air flow between the multi-layered panels 708A, 708B and the surface to which it will be applied.

On row 701DA of multi-layered panel 700A, the second portion 716A of foam layer 708A extends beyond concrete layer 706A a uniform width to form slat 710D. On rows 701EB, 701FB, 701GB, 701HB of multi-layered panel 700B, the second portion 716B of foam layer 708B extends beyond concrete layer 706B a uniform width to form slats 710E, 710F, 710G, 710H. On row 701HA of multi-layered panel 700A, the first portion 714A of foam layer 708A extends beyond the second portion 716A to form a first void 720. On rows 701EB, 701FB, 701GB, 701HB of multi-layered panel 700B, the first portion 714B of foam layer 708B extends beyond the second portion 716B to form second voids 724AA, 724AB, 724BA, 724BB, 724CA, 724CB, 724DA, 724DB. Second voids 724AA, 724AB, 724BA, 724BB, 724CA, 724CB, 724DA, 724DB also extend into and meet on the leftward most portion of foam layer 716B of rows 701AB, 701BB, 701CB. Slat 710H fits into first void 720 when multi-layered panels 700A, 700B are assembled together in a side by side manner. Also, slat 710D fits between second voids 724AB and 724BA between row 701HB and row 701GB.

Multi-layered panel 700 also has a slat system for connecting multiple multi-layered panels 700 one on top of the other. Second void 724AA (Shown in FIG. 7B) continues along the bottom of multi-layered panel 700B along row 701HB. Slat 710A (Shown in FIG. 7A) runs along the top of multi-layered panel 700 along row 701A. Slat 710A of a first multi-layered panel fits into second void 724AA of a second multi-layered panel installed directly above the first multi-layered panel.

FIG. 8A shows a third embodiment of multi-layered panel 800 for use in a veneer system. In this embodiment multi-layered panel 800 simulates lap siding. Multi-layered panel 800 can have many variations in the configuration of the lap siding. In the embodiment shown, multi-layered panel 800 comprises two offset rows of lap siding 820, 822. In other embodiments multi-layered panel 800 can have only one row of lap siding. One benefit of having offset rows 820, 822 is to facilitate alignment of multiple multi-layered panels 800 during installation of the veneer system.

Multi-layered panel 800 comprises a concrete layer 802 and a foam layer 804. The layers of this embodiment of the invention are similar to that of the first and second embodiments. The manufacturing of multi-layered panel 800 is also similar to that of the first and second embodiment. Concrete layer 802 is a thin uniformly thick layer that is cast onto foam layer 804. Thus, foam layer 804 completely fills in the back side of concrete layer 802. Concrete layer 802 simulates the look of real lap siding. Foam layer 804 provides an easily shapable, lightweight material for forming other features that enhance multi-layered panel 800. The combination of a thin concrete layer and a foam backing layer creates a panel that is extremely lightweight. Lightweight panels are easier to transport and install. Lightweight panels also make it possible to create larger panels. Larger panels reduce the number of seam lines on finished walls on which the veneer system has been installed.

Edge perimeter region 810 of multi-layered panel 800 includes a tongue and groove system. The right side of multi-layered panel 800 has a tongue 812 for insertion into a groove on a left side of an adjacent multi-layered panel 800.

Along the top of multi-layered panel 800 there is a slat 806 for inserting under a lip 808 of another multi-layered panel 800.

Figure 8B:
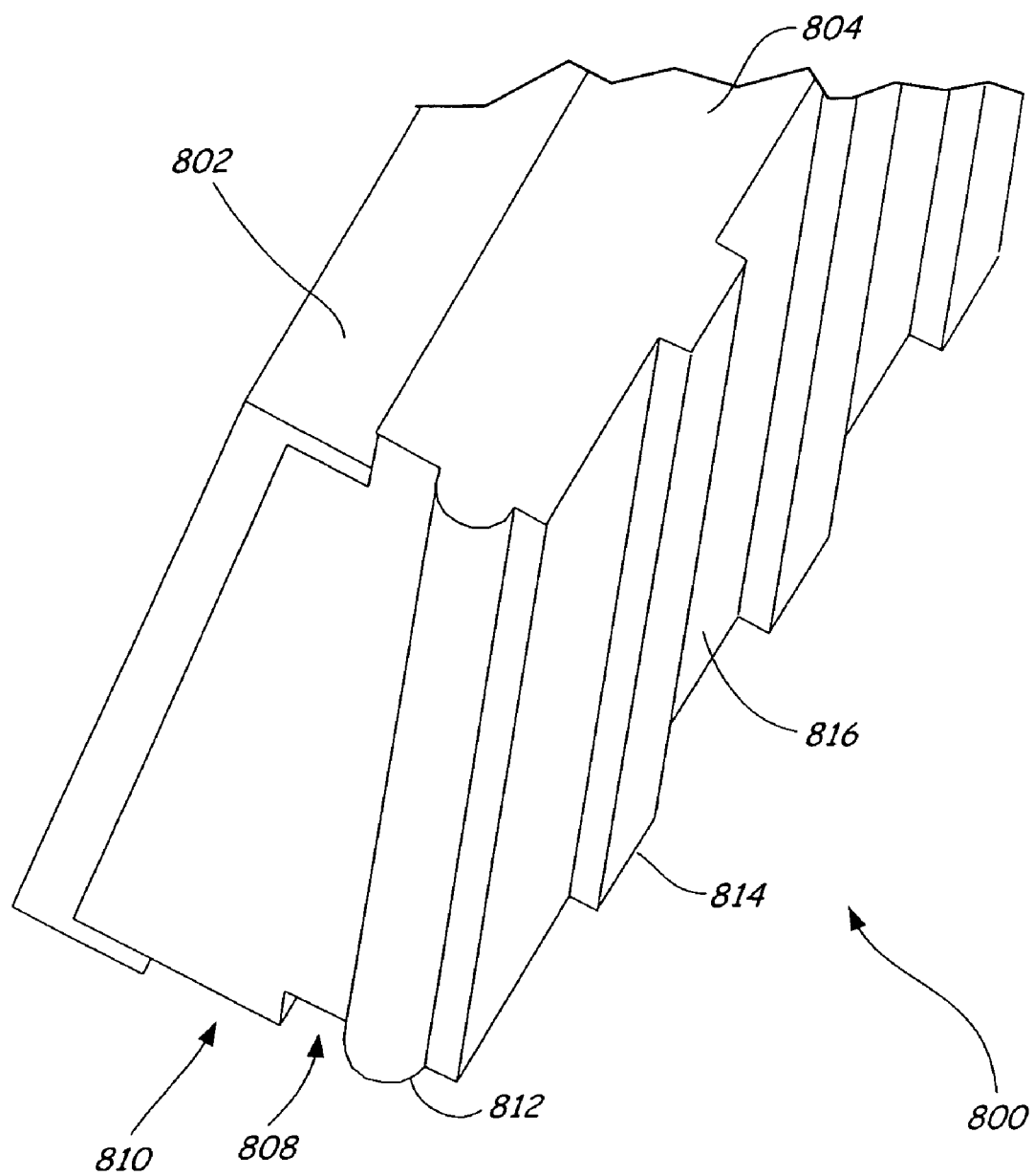
FIG. 8B shows the edge perimeter region and back side of the multi-layered panel.

FIG. 8B shows edge perimeter region 810 and the back side of multi-layered panel 800. Tongue 812 of the tongue and groove system can be seen. The rib 814 and groove 816 system of the back side of multi-layered panel 800 can also be seen. The rib 814 and groove 816 system is similar in design and operation as the rib 110 and groove 112 system of the first embodiment of multi-layered panel 100, shown in FIGS. 1B, 1C and 6. The contours allow airflow between multi-layered panel 800 and the surface to which it will be mounted. The ribs 814 also serve as a continuous surface for easily applying double sided adhesive tape, or any other adhesive system, to allow easy installation of multi-layered panel 800.

Figure 9:
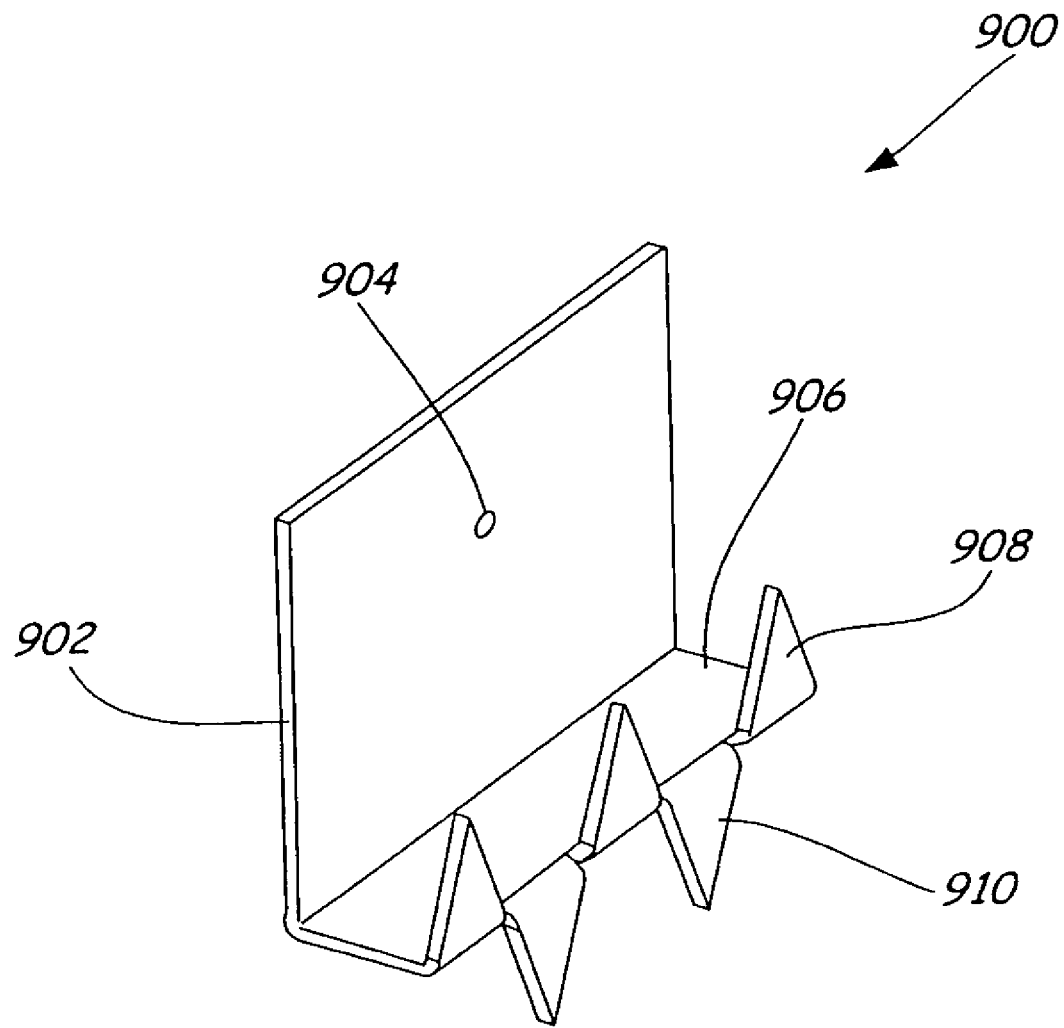
FIG. 9 shows a fastener that can be used in conjunction with the present invention.

FIG. 9 shows a fastener 900 that can be used in conjunction with the present invention. Fastener 900 is used to install multi-layered panels on a surface of a wall. Fastener 900 consists of mounting member 902 for mating with a surface to which the multi-layered panel will be mounted. Mounting member 902 contains hole 904 to allow fastener 900 to be nailed or screwed to the mounting surface. Fastener 900 also has support member 906 that supports the multi-layered panel. Support member 906 has upward facing teeth 908 and downward facing teeth 910. Upward facing teeth 908 and downward facing teeth 910 are for insertion into the foam layer of the multi-layered panel.

Fastener 900 can be nailed or screwed to a mounting surface at a desired position. Then, a multi-layered panel can be placed with its back surface against the mounting surface above fastener 900. It is then slid down so that its bottom surface engages upward facing teeth 908. The bottom surface of multi-layered panel 100 should rest on the top surface of support member 906 such that upward facing teeth 908 are inserted into the foam layer of the multi-layered panel. Next, a second fastener 900 can be placed against the mounting surface above the multi-layered panel and slid down so that downward facing teeth 910 engage the top foam layer and the bottom of support member 906 rests on the top surface of the multi-layered panel. The second fastener 900 is then secured in place by driving a nail or screw through hole 904 of the second fastener 900.

The remainder of this disclosure is directed toward a multi-layered veneer panel that includes a foamed layer, a concrete surface layer, and different embodiments of a mounting device. Due to the hardness of super air entrained concrete, which is utilized as the foamed layer, conventional fasteners cannot be used to effectively mount the multi-layered veneer panel to a backing surface. Therefore, the mounting device disclosed is prefabricated and specifically designed to be cast into the multi-layered panel and to extend therefrom. Each multi-layered veneer panel is adapted with one or more slots or recesses that are sized and patterned to receive one or more mounting devices from adjacent multi-layered panels to give the appearance of a seamless joint between adjacent multi-layered panels when assembled. In this manner, several panels can be effectively mounted and assembled on the backing surface to form a wall facade that is light weight, easy to install, and fire resistant.

Figure 10:
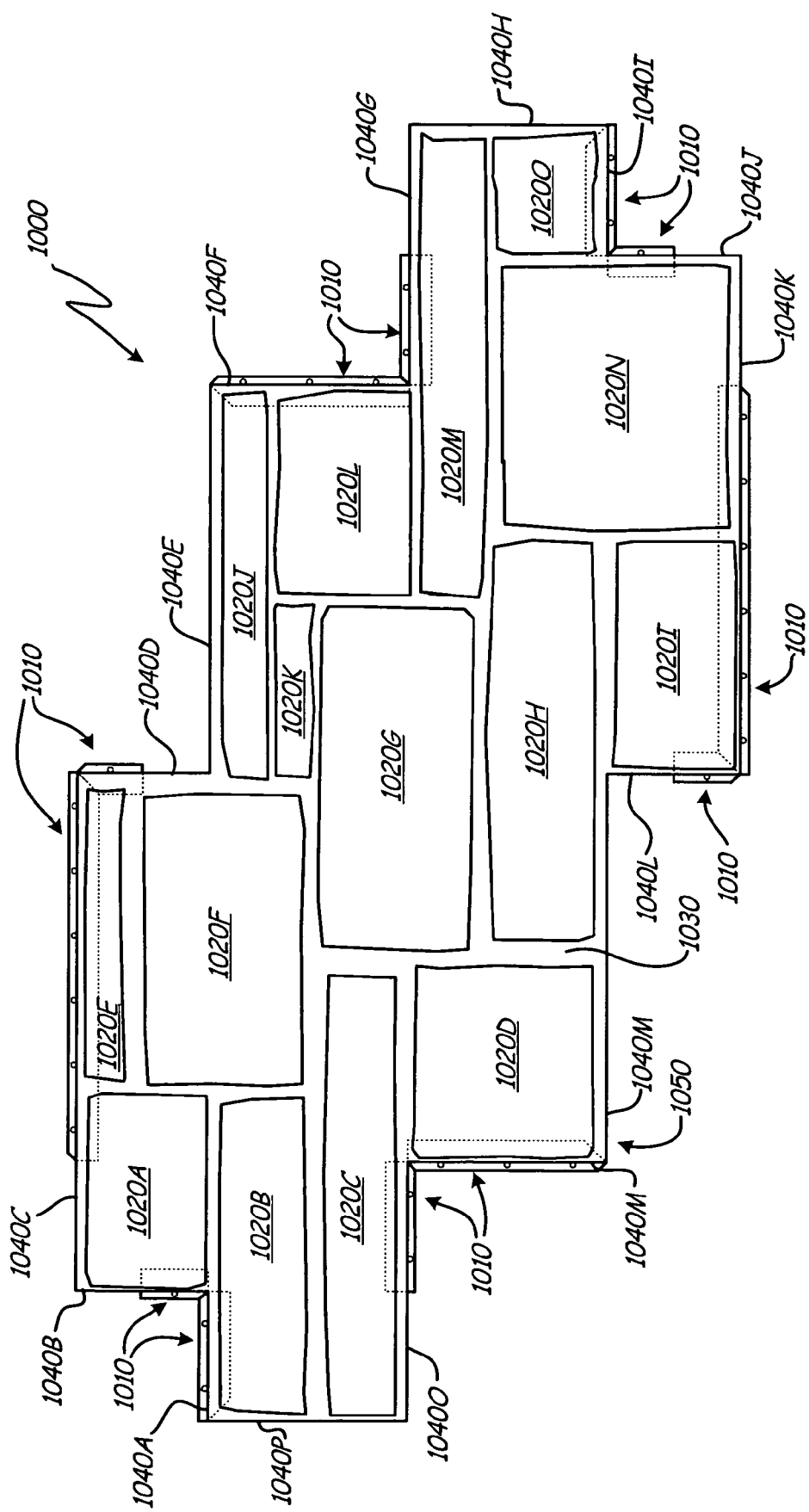
FIG. 10 shows a front view of a fourth embodiment of the multi-layered panel with a plurality of mounting devices disposed therein.

FIG. 10 shows a front view of a multi-layered panel 1000 with a plurality of mounting strips 1010 disposed therein. The portions of the mounting strips 1010 that extend into the interior of multi-layered panel 1000 are illustrated in FIG. 10 for the convenience of the viewer. Portions of mounting strips 1010 extend from the multi-layered panel 1000 and are adapted to receive a fastener to mount panel 1000 to a wall or another surface.

The front of multi-layered panel 1000 is a simulated cut stone pattern with simulated regions of mortar filling the space between the stones similar to that of multi-layered panel 100. However, in other embodiments multi-layered panel 1000 can be formed to simulate a variety of surfaces such as brick or wood. In the embodiment shown, there are fifteen individual stones 1020A-1020O. Individual stones 1020A-1020O each have a unique look and are arranged to appear carefully stacked thus creating regions of mortar 1030 with even spacing between the stones. Individual stones 1020A-1020O are represented by raised regions protruding beyond the surface of multi-layered panel 1000 and mortar 1030 is represented by lowered regions.

In the embodiment illustrated in FIG. 10, multi-layered panel 1000 utilizes a multi-edged shape to facilitate the appearance of natural cut and stacked stones. The multi-layered panel 1000 has sixteen sides 1040A-1040P. Side 1040A is the same length as side 1040I. Side 1040B is the same length as side 1040L. Side 1040C is the same length as side 1040K. Side 1040D is the same length as side 1040J. Side 1040E is the same length as side 1040M. Side 1040F is the same length as side 1040N. Side 1040G is the same length as side 1040O. Side 104014 is the same length as side 1040P. Thus, multi-shaped panel 1000 has edge symmetry when rotated one hundred eighty degrees.

The multi-edged shape allows individual stones 1020A-1020O to have various shapes and to be neatly stacked within the perimeter of multi-layered panel 1000. The placement of variously shaped stones and the multi-edged shape help to conceal the repetitive nature of using multiple multi-layered panels 1000.

Multi-layered panel 1000 also comprises edge perimeter region 1050. Edge perimeter region 1050 encircles the entire multi-layered panel 1000 and extends between the front and back of the panel 1000. Edge perimeter region 1050 is configured with slots (not shown) sized and shaped to receive portions of the mounting strips 1010 from other adjacent multi-layered panels 1000. Edge perimeter region 1050 begins in a lowered region of mortar 1030 such that the width of the mortar 1030 at the edge is less than what it normally would be as between two individual stones 1020A-1020O. Thus, when coupled with an adjacent multi-layered panel 1000, two partial regions of mortar 1030 at the edge of each multi-layered panel 1000 will create one whole region of mortar 1030. This feature, along with the slots discussed subsequently, helps to conceal the use of multiple multi-layered panel 1000.

Although not illustrated in FIG. 10, the back side of multi-layered panel 1000 is similar to that of multi-layered panel 100 and has a series of standoffs or ribs and grooves. The grooves and ribs can be interconnected by a chamfer that gives the ribs a trapezoidal cross-section. Similar to multi-layered panel 100, the ribs and grooves form a channel that facilitates air flow between multi-layered panel 1000 and the surface to which it will be attached. Other types of channels or grooves can also be featured on the back side of multi-layered panel 1000 to facilitate air flow.

Figure 11:
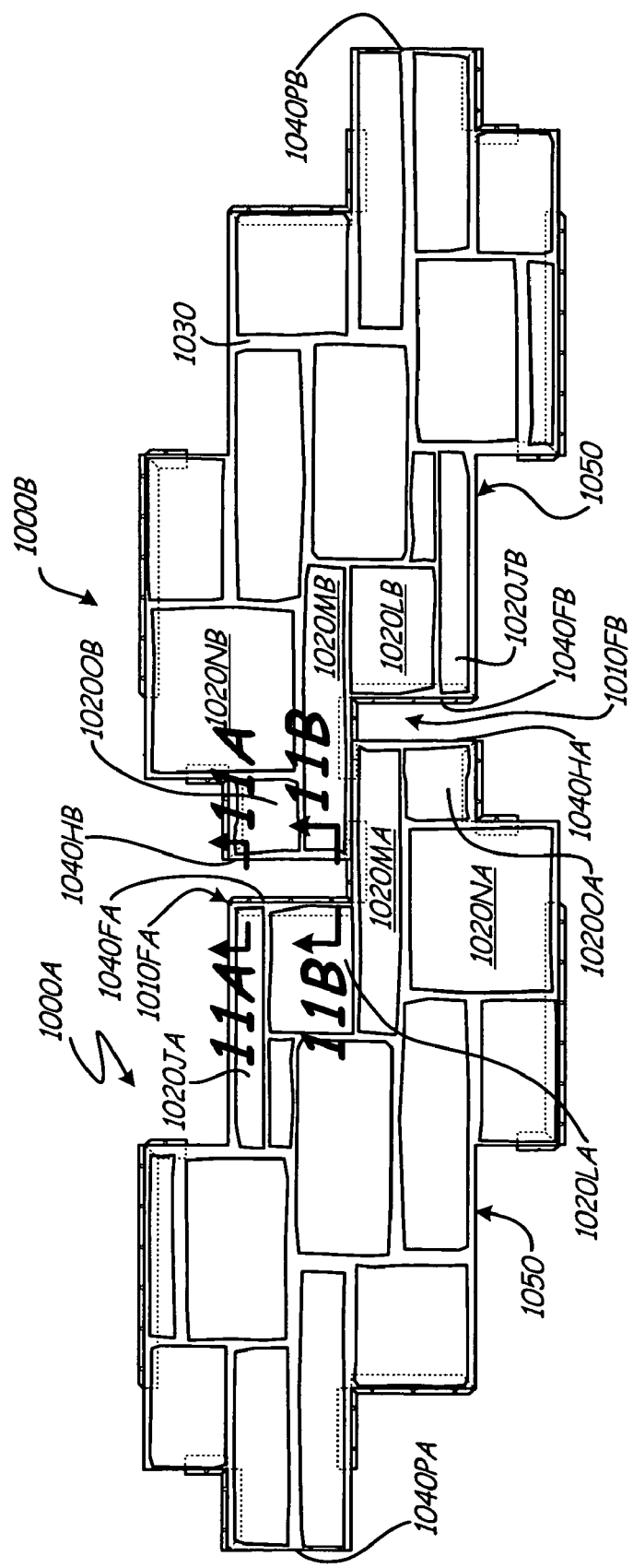
FIG. 11 shows a front view of two multi-layered panels from FIG. 10 coming together.

FIG. 11 shows a front view of two multi-layered panels 1000A and 1000B disposed adjacent one another in a configuration that allows them to come together. In FIG. 11, portions of mounting strips 1010 which extend within two multi-layered panels 1000A and 1000B are illustrated for the convenience of the viewer. Mounting strips 1010 extend outward from each multi-layered panel 1000A and 1000B along different locations around edge perimeter region 1050. Mounting strips 1010 are used to anchor multi-layered panels 1000A and 1000B to a backing surface such as a wall. As illustrated in FIG. 11, mounting strips 1010 are juxtaposed relative one another on each multi-layered panel 1000 such that mounting strips 1020 do not overlap when multi-layered panels 1000A and 1000B are assembled together. As will be discussed subsequently, edge perimeter region 1050 of the multi-layered panel 1000A or 1000B opposing each mounting strip 1010 is configured with a slot which receives the externally extending portion of the mounting strips 1010 therein. This arrangement aids in concealing the artificial nature of multi-layered panels 1000A and 1000B.

Multi-layered panels 1000A and 1000B are designed to be placed directly next to each other and directly above and below each other. The many sided shape of multi-layered panels 1000A and 1000B allows each multi-layered panel 1000A and 1000B to be installed in two orientations for every situation. More particularly, the multi-layered panels 1000A and 1000B can be installed in a first configuration or in a one hundred eighty degree rotation of the first configuration.

In FIG. 11, second multi-layered panel 1000B is located directly to the right of first multi-layered panel 1000A. Second multi-layered panel 1000B is rotated one hundred and eighty degrees as compared to the first multi-layered panel 1000A. Side 1040HB is designed to fit against side 1040FA and mounting strip 1010FA of multi-layered panel 1000A. Side 1040FB and mounting strip 1010FB of multi-layered panel 1000B are designed to fit against side 1040HA of multi-layered panel 1000A. Side 1040PA of the multi-layered panel 1000A is on the left side of the multi-layered panel 1000A. The equivalent side, side 1040PB, of the multi-layered panel 1000B is on the right side of the multi-layered panel 1000B. Second panel 1000B could also be placed where it is, but can also be rotated one hundred eighty degrees. Thus, side 1040PB is also designed to fit against side 1040FA and mounting strip 1010FA of multi-layered panel 1000A.

Multi-layered panels 1000A and 1000B can thus be placed directly above, below and next to each other in orientations to create a wall that simulates the random placement of unique stones in a real stone wall. The arrangement of mounting strips 1010 juxtaposed with slots allows for installation in the two orientations. Although illustrated with a stone pattern in FIG. 11, the shape of the pre-cast panels will be determined by the pattern that is desired. Stone patterns can have different shapes from the one illustrated based on the size and arrangements of the stones. Various other patterns such as lap siding or shingles can also be simulated. For example, multi-layered panels that simulate lap siding can have different shapes as determined by the width of the boards. Similarly, shingles shape can be determined by the height of each coarse. Brick patterns by particular size and pattern of the bricks. There are an unlimited number of different shapes that can be designed for custom graphics, textures and numerous art projects.

FIGS. 11A and 11B are cross-sections along A-A and B-B of multi-layered panels 1000A and 1000B from FIG. 11. Cross-section A-A extends through mounting strip 1010FA adjacent a fastener (not shown). Cross-section B-B extends through mounting strip 1010FA and fastener 1060. Multi-layered panels 1000A and 1000B are comprised of patterned surface layer 1070 and core 1080. Patterned surface layer 1070, and in some embodiments core 1080, includes slot 1090 and pocket 1100.

In FIGS. 11A and 11B, patterned surface layer 1070 simulates the look of a stone wall. Concrete is used for patterned surface layer 1070 because of its durability and because it realistically simulates the texture and likeness of a stone wall or other building finishes. Individual stones 1020J, 1020L, 1020M, and 1020O are shown as raised regions of the portion of patterned surface layer 1070 shown in FIGS. 11A and 11B. Simulated mortar 1030 fills in the space between individual stones 1020J, 1020L, 1020M, and 1020O and at the edges of the individual stones 1020J, 1020L, 1020M, and 1020O.

Patterned surface layer 1070 is cast to have a uniform thickness of between about 0.25 to 0.375 inches. In one embodiment, patterned surface layer 1070 comprises a mix of a portland cement, a fine sand, a pozzolan additive, pva monofilament fibers, an acrylic polymer, an inorganic color, a super plasticizing agent, and water. In other embodiments, a synthetic concrete or various mortars could be used for patterned surface layer 1070 as well. Patterned surface layer 1070 is spray applied to a mold (not shown) that has the topology of a desired surface finish for a wall. The topology features of the mold provide a foundation for patterned surface layer 1070. Dyes or additives can be added to the mold prior to spray application of patterned surface layer 1070 to give the concrete the appearance of a desired texture. The liquid or powder dyes can be applied in various patterns and quantities to enhance the final appearance of multi-layered panels 1000A and 1000B.

Core 1080 is a foamed concrete (commonly called an aerated concrete or super air entrained concrete) mixture. Core 1080 is comprised of a base concrete mixture similar to that used for patterned surface layer 1070 with the addition of an air entraining additive. Many air entraining admixtures are commercially available and can be used with various base mixtures to form core 1080. In one embodiment, air entraining additive comprises the Polychem® line of additives retailed by General Resource Technologies, Inc. of Eagan, Minn. The base concrete mix (portland cement, fine sand, pozzolan additive, pva monofilament fibers, acrylic polymer, inorganic color, super plasticizing agent, and water) is blended with higher quantities of liquid materials (e.g., water) and the air entraining additive. Other additives can be substituted for various constituents of the base concrete mix or can be added to the mix to further lighten the core 1080. These additives can include: lightweight sands or aggregates, and/or recycled plastics or recycled foam. The resulting core 1080 has a density of between about 60 to 80 percent that of conventional concrete. Before core 1080 can set, it is poured or sprayed into the back cavity of the mold onto patterned surface layer 1070, and is struck off level with the back of the mold. If core 1080 is sprayed onto the back of patterned surface layer 1070, a nozzle that mixes the air entraining additive with the base concrete in stream can be used. A molded back form is pressed onto the back of core 1080 and locked into position until core 1080 and surface layer 1070 are cured enough for demolding.

Systems for interconnecting adjacent multi-layered panels 1000 such as panel 1000A and 1000B can be incorporated into edge perimeter region 1050 of patterned surface layer 1070. For example, mounting strips 1010 are inserted into the multi-layered panel 1000 and to extend from edge perimeter region 1050 in varying arrangements during the molding process. In FIGS. 11A and 11B, mounting strip 1010FA is inserted into side 1040FA of multi-layered panel 1000A. An insert is inserted into and then removed from side 1040HB to form slot 1090. As illustrated in FIG. 11B, portions of removable insert are adapted to create pocket 1100. Pocket 1100 is in communication with slot 1090 and extends toward a back edge of patterned surface layer 1070 away from slot 1090. Pocket 1100 is positioned to receive fastener 1060 when multi-layered panels 1000A and 1000B come together. In this manner, fastener 1060 can extend from mounting strip 1010FA into a surface such as a wall.

Slot 1090 is sized, shaped, and patterned to extend along portions of edge perimeter region 1050 (and possibly into core 1080) that do not have mounting strips 1010 extending therefrom. In FIGS. 11A and 11B, slot 1090 receives the externally extending portion of mounting strip 1010FA when panels 1000A and 1000B come together. In this manner, the externally extending portion of mounting strip 1010FA would not be visible to the viewer once multi-layered panels 1000A and 1000B come together which aids in concealing the artificial nature of multi-layered panels 1000A and 1000B.

The combination of a thin concrete layer for patterned surface layer 1070 and a foamed concrete for core 1080 make multi-layered panels 1000 extremely lightweight and fire resistant. Multi-layered panels 1000 can be cost effectively constructed which makes it possible to create larger panels. Larger multi-layered panels 1000 reduce the number of seam lines on finished walls, thereby reducing the noticeability of repeated panels.

Figure 12:
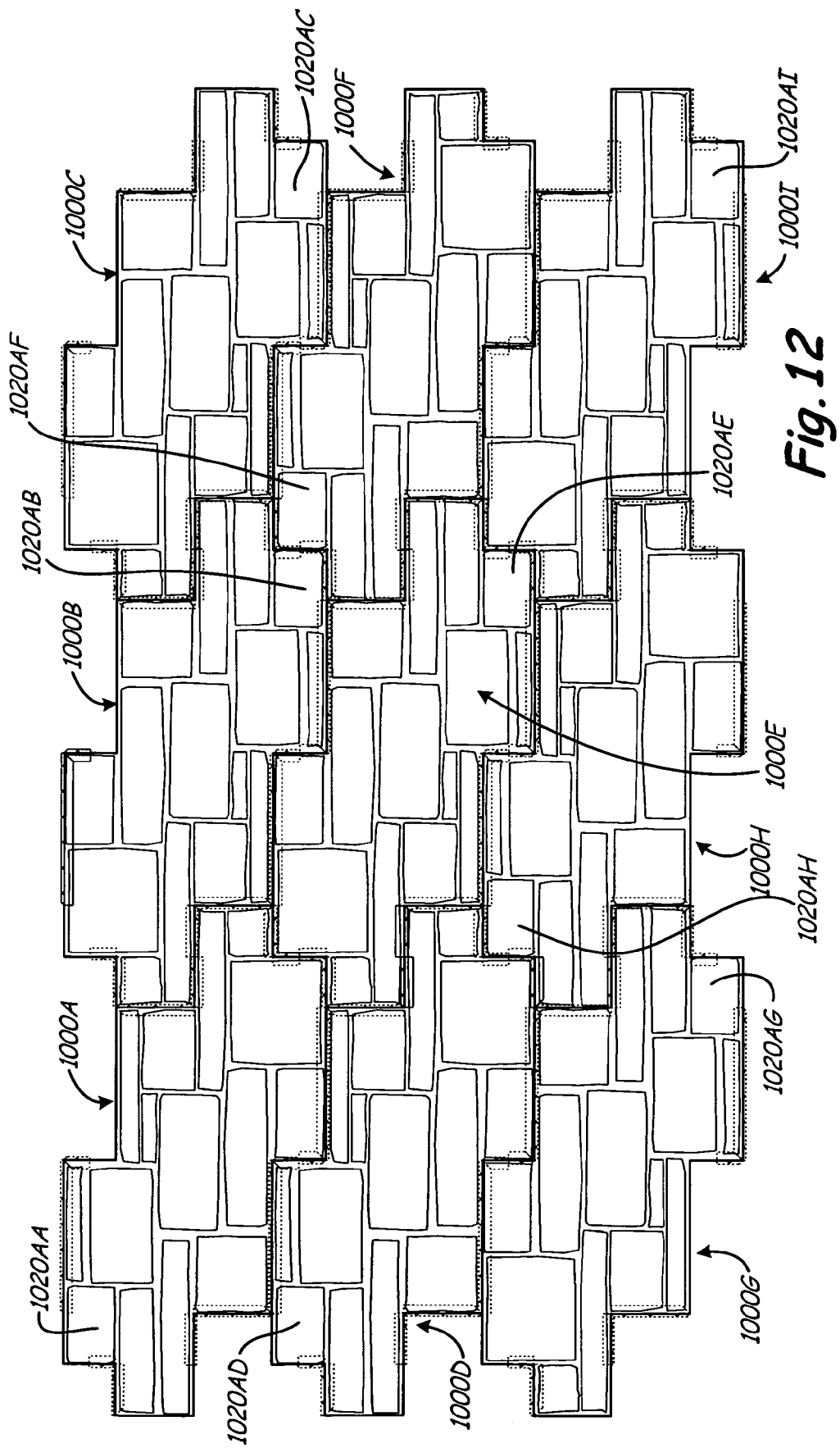
FIG. 12 shows multiple multi-layered panels connected together and having the mounting devices extending therefrom.

FIG. 12 shows a plurality of multi-layered panels 1000A-1000I interconnected together. To aid the viewer, the mounting strips are illustrated. Each multi-layered panel 1000A-1000I has a plurality of mounting strips 1010 and slots 1090 (FIGS. 11A and 11B). Adjoining panels 1000A-1000I juxtapose mounting strips 1010 with slots 1090 so as to conceal the artificial and repetitive nature of multi-layered panels 1000A-1000I. The interconnected multi-layered panels 1000A-1000I together form an integrated wall facade with minimal seam lines and a non-repetitive look.

Figure 13:
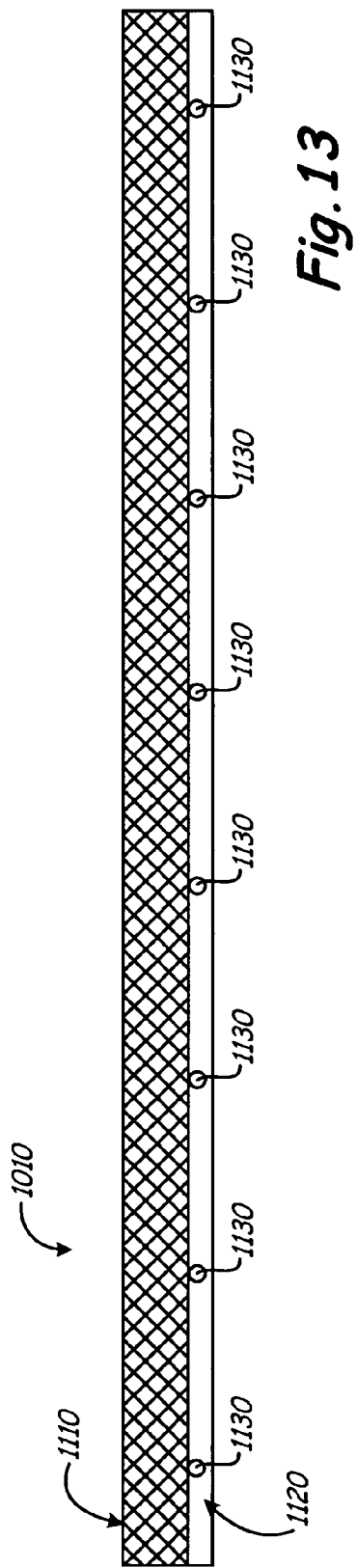
FIG. 13 shows a single mounting device used with the multi-layered panels.

FIG. 13 shows a single mounting strip 1010. Mounting strip 1010 has an internal portion 1110 and an external portion 1120. External portion includes apertures 1130. In one embodiment, mounting strip 1010 is fabricated prior to casting of multi-layered panel 1000 and is comprised of plastic or galvanized metal that can be cut into strips as desired to support multi-layered panel 1000. Internal portion 1110 is perforated with a plurality of diamond or square shaped apertures. In one embodiment, diamond shaped apertures are 0.25 inches wide and internal portion 1110 is about 1 inch in width. As previously discussed, internal portion 1110 is cast into patterned surface layer 1070 (FIGS. 11A and 11B) and core 1080 (FIGS. 11A and 11B) to extend along a plurality of desired locations around the edge perimeter region 1050 of multi-layered panel 1000.

External portion 1120 is integrally connected to internal portion 1110 and is adapted to extend along edge perimeter region 1050 in desired locations. In one embodiment, external portion 1120 is about 0.375 inches in width and 3/32 inches in thickness. Apertures 1130 can be countersunk and are pre-drilled to extend through various locations in external portion 1120. In one embodiment, apertures 1130 are spaced about 1.50 inches from the end of the external portion 1120 and are spaced about 3 inches from one another. The size and location of apertures 1130 along external portion 1120 may vary depending upon the weight and/or configuration of the multi-layered panel. Similarly, the width, thickness and length of internal portion 1110 and external portion 1120 can vary depending upon the weight and/or configuration of the multi-layered panel. Conventional fasteners can be inserted through apertures 1130 to attach the multi-layered panel to a surface such as a wall.

Figure 14:
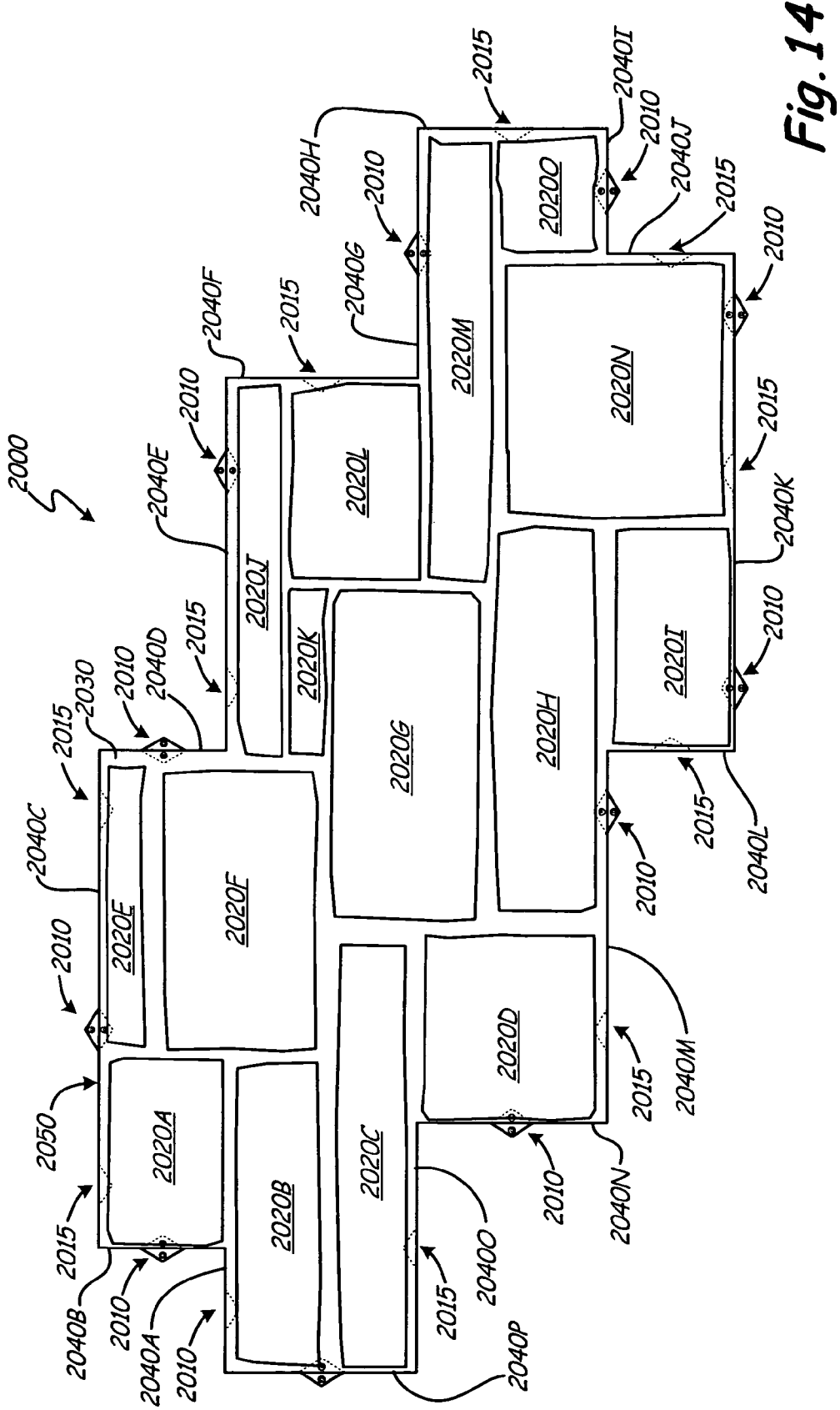
FIG. 14 shows a front view of a fifth embodiment of the multi-layered panel with a second embodiment of a plurality of mounting devices disposed therein.

FIG. 14 shows a front view of another embodiment of a multi-layered panel 2000 with a plurality of mounting inserts 2010 disposed therein. Multi-layered panel 2000 has a plurality of slots 2015 that are shown in phantom and which are adapted to receive mounting inserts 2010. Multi-layered panel 2000 is constructed with a layer of super air entrained concrete and has a pattern similar to the multi-layered panel 1000 shown in FIGS. 10-13. Portions of the mounting inserts 2010 extend from the multi-layered panel 2000 along various locations of edge perimeter region. 2050 and are adapted to receive a fastener to mount the panel 2000 to a wall or another surface. Slots 2015 are disposed in various locations of edge perimeter region 2050.

Figure 15:
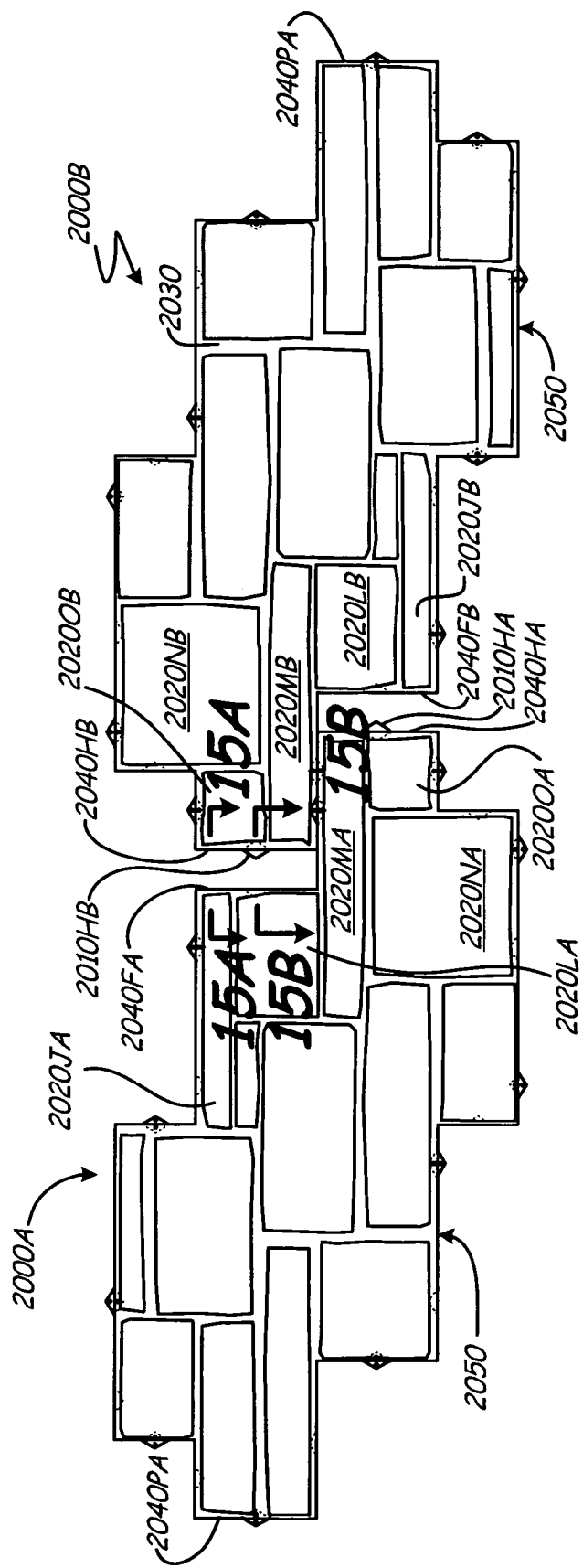
FIG. 15 shows a front view of two multi-layered panels from FIG. 14 coming together.

FIG. 15 shows a front view of two multi-layered panels 2000A and 2000B disposed adjacent one another in a configuration that allows them to come together. Side 2040FA and slot 2015FA are designed to fit against side 2040HB and mounting insert 2010HB of multi-layered panel 2000A. Side 2040FB and mounting insert 2010FB of multi-layered panel 2000B are designed to fit against side 2040HA and slot 2015HA of multi-layered panel 2000A. Second multi-layered panel 2000B is rotated one hundred and eighty degrees as compared to the first multi-layered panel 2000A in FIG. 15. In other embodiments, mounting inserts 2010 and slots 2015 can be arranged in a pattern that allows multi-layered panel 2000B to come together with multi-layered panel 2000A without being rotated one hundred and eighty degrees.

FIGS. 15A and 15B are cross-sections along A-A and B-B of multi-layered panels 2000A and 2000B from FIG. 15. Cross-section A-A extends through multi-layered panels 2000A and 2000B adjacent mounting insert 2010FB, which is not shown. Cross-section B-B extends through mounting insert 2010HB and fastener 2060. Similar to multi-layered panels 1000A and 1000B, multi-layered panels 2000A and 2000B are comprised of patterned surface layer 2070 and core 2080. Patterned surface layer 2070, and in some embodiments core 2080, forms slot 2015 and pocket 2100.

Mounting inserts 2010 are inserted into the patterned surface layer 2070 and core 2080 along the edge perimeter region 2050 in varying arrangements during the molding process. In FIGS. 15A and 15B, mounting insert 2010HB is inserted into side 2040HB of multi-layered panel 2000B. Similar to multi-layered, panels 1000A and 1000B, during the casting process an insert is inserted into and then removed from multi-layered panels 2000A and 2000B to form slots 2015 therein. As illustrated in FIG. 15B, portions of removable insert are adapted to create pocket 2100. Each pocket 2100 is in communication with each slot 2015 and extends toward a back edge of patterned surface layer 1070 away from slot 2015. Pocket 2100 is positioned to receive fastener 2060 when multi-layered panels 2000A and 2000B come together. In this manner, fastener 2060 can extend from mounting strip 2010HB into a surface such as a wall.

Slots 2015 are patterned to extend along various portions of edge perimeter region 1050 that do not have mounting inserts 2010 extending therefrom. In FIGS. 11A and 11B, slot 2015FA receives the externally extending portion of mounting insert 2010HB when panels 2000A and 2000B come together. In this manner, the externally extending portion of mounting insert 2010HB would not be visible to the viewer once multi-layered panels 2000A and 2000B come together which aids in concealing the artificial nature of multi-layered panels 2000A and 2000B.

Figure 16:
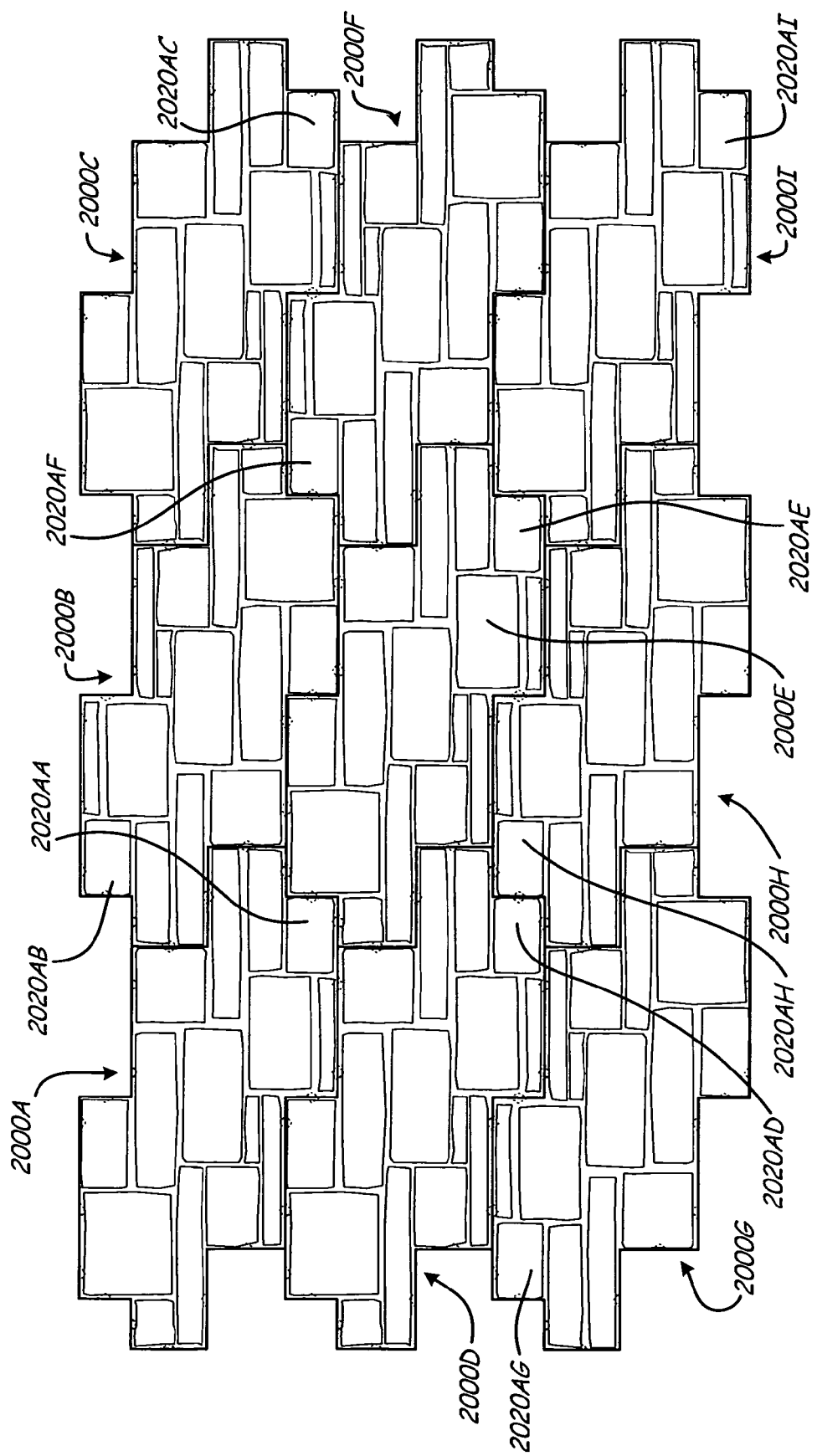
FIG. 16 shows multiple multi-layered panels connected together and having the mounting inserts extending therefrom.

FIG. 16 shows a plurality of multi-layered panels 2000A-2000I interconnected together. To aid the viewer, some mounting inserts 2010 are illustrated in phantom. Each multi-layered panel 2000A-2000I has a plurality of mounting inserts 2010 and slots 2015 (FIGS. 15A and 15B). The interconnected multi-layered panels 2000A-2000I together form an integrated wall facade with minimal seam lines and a non-repetitive look.

Figure 17:
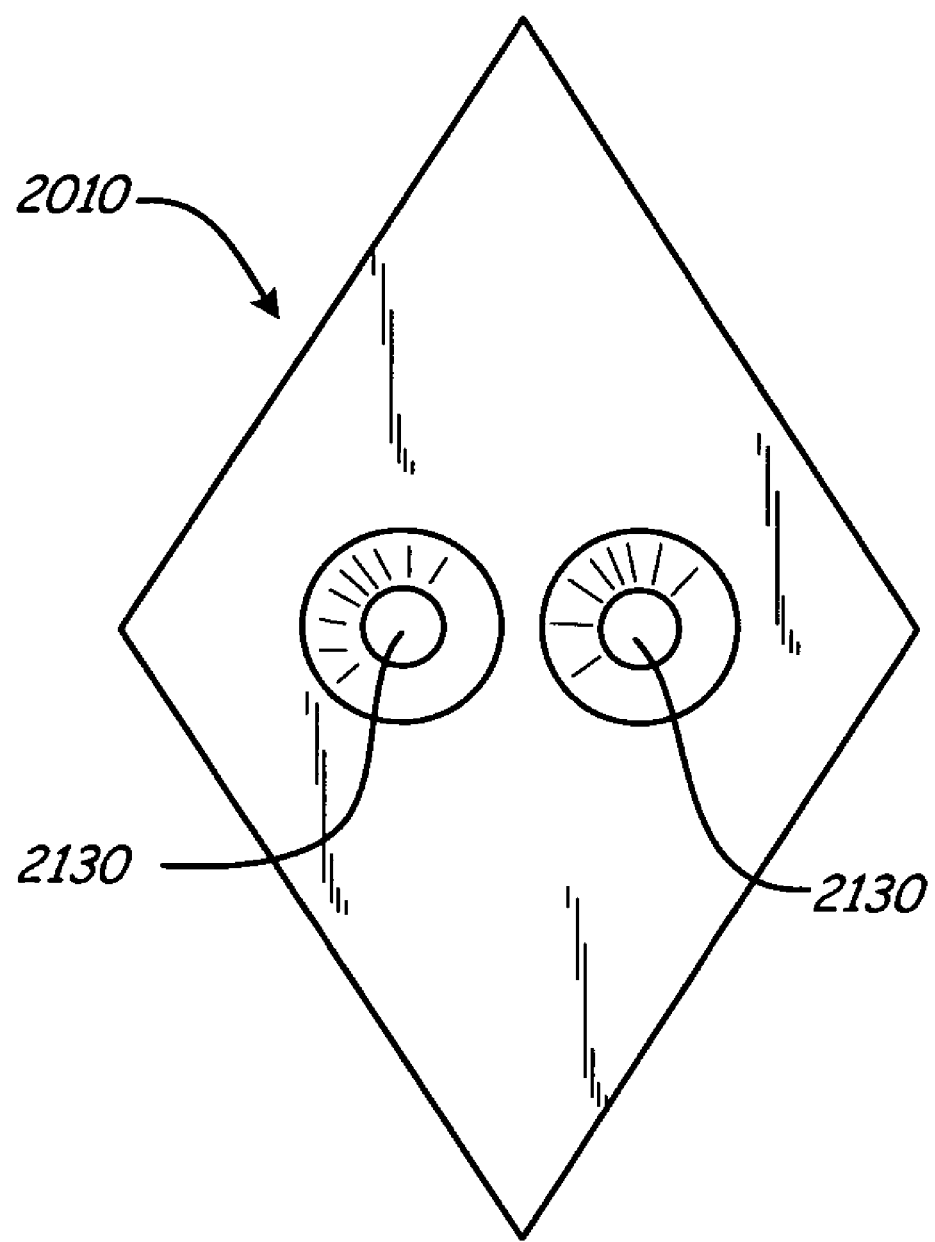
FIG. 17 shows a single mounting device used with the multi-layered panels.

FIG. 17 shows mounting insert 2010. Mounting insert 2010 is a diamond shaped flat plastic or metallic disc. Mounting insert 2010 has preformed countersunk apertures 2130 that are disposed to extend through the narrower center portion of the mounting insert 2010. In one embodiment, mounting insert 2010 is 2 inches in length, 1.25 inches in width and 3/32 inches in thickness. The width, thickness and length of mounting insert 2010 and apertures 2130 can vary depending upon the weight and/or configuration of the multi-layered panel. Conventional fasteners can be inserted through apertures 2130 to attach the multi-layered panel to a surface such as a wall.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A veneer panel comprising:
   a multi-layered panel having a foamed layer and a concrete surface layer, wherein the foamed layer comprises a super air entrained concrete, wherein the concrete surface layer forms a front surface of the multi-layered panel that approximates a desired topography of a simulated wall and the air entrained concrete layer forms a back surface of the multi-layered panel which interfaces with a surface the multi-layered panel is mounted on, and wherein the multi-layered panel includes an edge perimeter region that extends between the front surface and the back surface, wherein the edge perimeter region is formed by the concrete surface layer and the one or more slots extend only into the concrete surface layer; and
   a mounting device that is cast into the multi-layered panel and extends therefrom, wherein the mounting device extends outward from one or more locations along the edge perimeter region.

2. The veneer panel of claim 1, wherein the mounting device is cast into one or both of the air entrained concrete layer and the concrete surface layer of the multi-layered panel.

3. The veneer panel of claim 1, wherein the mounting device comprises a prefabricated metallic or plastic strip that has a first portion adapted to extend from the multi-layered panel and receive one or more fasteners and a second portion adapted to be cast internally within the multi-layered panel.

4. The veneer panel of claim 3, wherein the second portion is perforated with one or more apertures.

5. The veneer panel of claim 1, wherein the mounting device comprises a plurality of prefabricated metallic or plastic generally flat diamond shaped inserts with one or more apertures extending therethrough.

6. The veneer panel of claim 1, wherein the desired topography of the front surface comprises one of: a stone pattern, a brick pattern, a log pattern, a lap siding pattern, or a shingle pattern.

7. The veneer panel of claim 1, wherein the foamed layer has a rib and groove pattern along an exterior surface thereof.

8. A veneer panel system comprising:
a plurality concrete veneer panels, wherein the panels are configured to interact with one another as a modular system when assembled, the assembled veneer panels having the appearance a randomized non-repeating pattern that approximates a desired topography of a simulated wall; and
each of the plurality of veneer panels comprising:
 a concrete surface layer that forms a front surface and an edge perimeter region of the veneer panel;
 a foamed super air entrained concrete core that is disposed adjacent the concrete surface layer, the foamed concrete forms an inner core and back layer of the veneer panel, wherein the foamed core has a rib and groove pattern along an exterior surface thereof;
wherein, the rib and groove pattern of each veneer panel extends in substantially a same direction relative to one another when the plurality of veneer panels are assembled.

9. The veneer panel of claim 8, wherein the foamed core comprises a super air entrained concrete.

10. The veneer panel of claim 9, wherein the edge perimeter region is adapted with one or more slots that are sized and patterned to receive one or more mounting devices from adjacent multi-layered panels to give the appearance of a seamless joint between adjacent multi-layered panels when assembled.

11. The veneer panel of claim 10, wherein the edge perimeter region has one or more pockets in communication with the one or more slots, the pockets allow a fastener received by the mounting device to extend to a surface the multi-layered panel is mounted on.

12. The veneer panel of claim 11, wherein the mounting device comprises a prefabricated metallic or plastic strip or insert.

13. The veneer panel system of claim 8, wherein the desired topography of the front surface comprises one of: a stone pattern, a brick pattern, a log pattern, a lap siding pattern, or a shingle pattern.

* * * * *

UNITED STATES PATENT AND TRADEMARK OFFICE
CERTIFICATE OF CORRECTION

PATENT NO. : 8,256,179 B2
APPLICATION NO. : 12/653098
DATED : September 4, 2012
INVENTOR(S) : Paul C. Nasvik Page 1 of 1

It is certified that error appears in the above-identified patent and that said Letters Patent is hereby corrected as shown below:

In the Specification

Col. 11, Line 31
Delete "104014"
Insert --1040H--

Col. 13, Line 9
Delete "10200"
Insert --1020O--

Signed and Sealed this
Tenth Day of December, 2013

Margaret A. Focarino
*Commissioner for Patents of the United States Patent and Trademark Office*